(12) United States Patent
Venkatesh et al.

(10) Patent No.: US 8,744,124 B2
(45) Date of Patent: Jun. 3, 2014

(54) SYSTEMS AND METHODS FOR DETECTING ANOMALIES FROM DATA

(75) Inventors: Svetha Venkatesh, Winthrop (AU); Budhaditya Saha, Karawara (AU); Mihai Mugurel Lazarescu, Burswood (AU); Duc-Son Pham, Shelley (AU)

(73) Assignee: Curtin University of Technology, Perth (AU)

( * ) Notice: Subject to any disclaimer, the term of this patent is extended or adjusted under 35 U.S.C. 154(b) by 107 days.

(21) Appl. No.: 13/262,232

(22) PCT Filed: Apr. 1, 2010

(86) PCT No.: PCT/AU2010/000379
§ 371 (c)(1),
(2), (4) Date: Nov. 8, 2011

(87) PCT Pub. No.: WO2010/111748
PCT Pub. Date: Oct. 7, 2010

(65) Prior Publication Data
US 2012/0063641 A1 Mar. 15, 2012

(30) Foreign Application Priority Data

Apr. 1, 2009 (AU) .............................. 2009901406
Dec. 4, 2009 (AU) .............................. 2009905937

(51) Int. Cl.
*G06K 9/00* (2006.01)
*G06T 7/20* (2006.01)
(52) U.S. Cl.
USPC ........................... 382/103; 382/107; 382/181
(58) Field of Classification Search
None
See application file for complete search history.

(56) References Cited

U.S. PATENT DOCUMENTS

| 2006/0029279 | A1 | 2/2006 | Donoho | |
|---|---|---|---|---|
| 2008/0228446 | A1* | 9/2008 | Baraniuk et al. | 702/189 |
| 2010/0176952 | A1* | 7/2010 | Bajcsy et al. | 340/573.1 |
| 2010/0306290 | A1* | 12/2010 | Zhang et al. | 708/205 |

FOREIGN PATENT DOCUMENTS

| CN | 101169623 A | 4/2008 |
|---|---|---|
| CN | 101271527 A | 9/2008 |
| CN | 101371275 A | 2/2009 |
| WO | WO 2007/083104 A1 | 7/2007 |

OTHER PUBLICATIONS

Venkatraman et al. "A Compressive Sensing Approach to Object-based Surveillance Video Coding." IEEE International Conference on Acoustics, Speech and Signal Processing, Apr. 19, 2009, pp. 3513-3516.*
Meng et al. "Sparse Event Detection in Wireless Sensor Networks Using Compressive Sensing." 43rd Annual Conference on Information Sciences and Systems, Mar. 18, 2009, pp. 181-185.*

(Continued)

*Primary Examiner* — Jon Chang
(74) *Attorney, Agent, or Firm* — David B. Tingey; Kirton McConkie

(57) ABSTRACT

The present disclosure concerns methods and/or systems for processing, detecting and/or notifying for the presence of anomalies or infrequent events from data. Some of the disclose methods and/or systems may be used on large-scale data sets. Certain applications are directed to analyzing sensor surveillance records to identify aberrant behavior. The sensor data may be from a number of sensor types including video and/or audio. Certain applications are directed to methods and/or systems that use compressive sensing. Certain applications may be performed in substantially real time.

20 Claims, 16 Drawing Sheets

(56) References Cited

OTHER PUBLICATIONS

Schindler et al., "Internet Video Category Recognition", IEEE Workshop on Internet Vision, Jun. 2008, pp. 1-7.

Candès et al., "An Introduction to Compressive Sampling", IEEE Signal Processing Magazine, Mar. 2008, pp. 21-30.

Elad, "Optimized Projections for Compressed Sensing", IEEE Transactions on Signal Processing, Dec. 2007, pp. 5695-5702, vol. 55, No. 12.

Donoho, "Compressed Sensing", IEEE Transaction Information Theory, Apr. 4, 2006, pp. 1289-1306, vol. 52, No. 4.

Andrade et al., "Modelling Crowd Scenes for Event Detection", 18$^{th}$ International Conference on Pattern Recognition, 2006, pp. 175-178, vol. 1.

Candès, "Compressive Sampling", Proceedings of the International Congress of Mathematicians, 2006, pp. 1-20.

Lakhina et al., "Diagnosing Network-Wide Traffic Anomalies", Proceedings of ACM SIGCOMM, Aug.-Sep. 2004, pp. 1-12.

Zhang, Jian, "Key Technology of Content-Based Intelligent Video Surveillance and Application Research Thereof in Public Security", Informational Science and Technology, China Doctoral Dissertations, Jun. 15, 2008, pp. 1-20 (full text pp. 1-145), Issue No. 6.

* cited by examiner

FIG. 11(a)
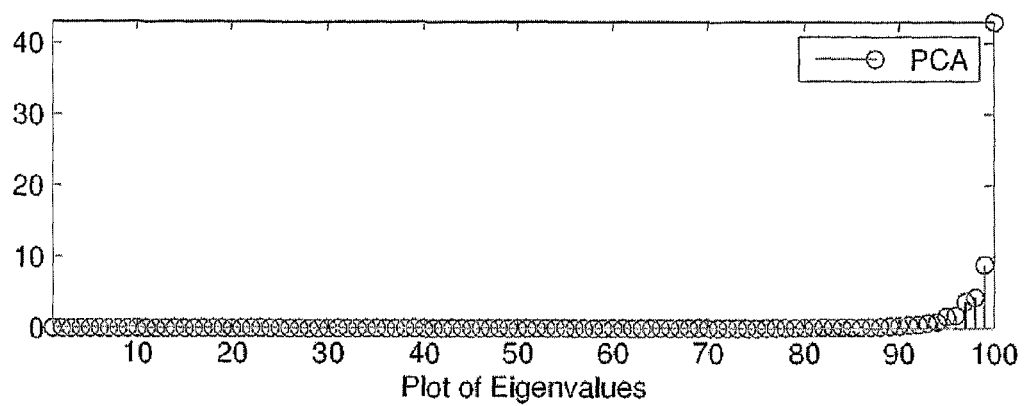
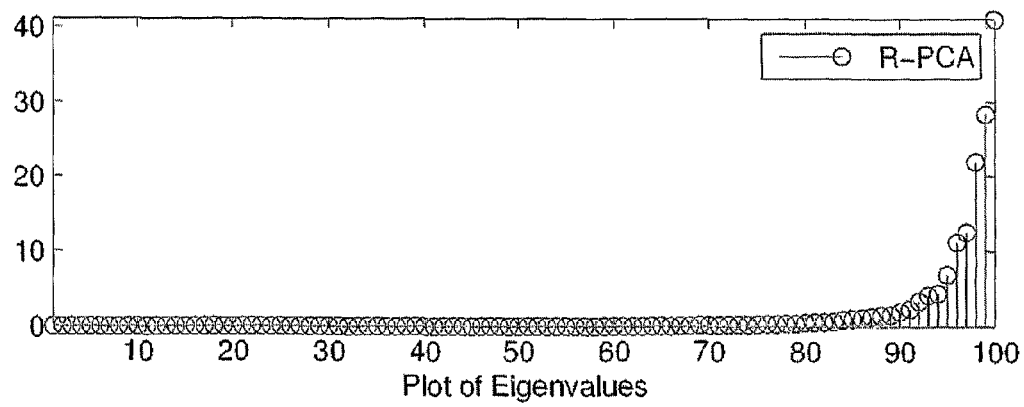
FIG. 11(b)

SYSTEMS AND METHODS FOR DETECTING ANOMALIES FROM DATA

CROSS REFERENCE

The present application claims priority from Australian Provisional Patent Application No. 2009901406 entitled "Detecting Anomalous Behaviour" filed on Apr. 1, 2009; and Australian Provisional Patent Application No. 2009905937 entitled "Detecting Anomalies from Data" filed on Dec. 4, 2009. The entire content of each of these applications is hereby incorporated by reference. In addition the entire content of each of the following references is incorporated by reference: A. Lakhina, M. Crovella, and C. Diot. Diagnosing Network-Wide Traffic Anomalies. In Proceedings of ACM SIGCOMM, pp. 219-230 2004; M. Elad. Optimized Projections for Compressed Sensing. IEEE Transactions on Signal Processing 55(12): 5695-5702, 2007; and S. Budhaditya, D-S. Pham. M. Lazarescu, and S. Venkatesh. Effective Anomaly Detection in Sensor Networks Data Streams. In Proceedings of the Ninth International Conference on Data Mining, Miami Fla., pp. 722-727, 2009.

TECHNICAL FIELD

The present disclosure concerns the detection of anomalies or infrequent events from data. In certain embodiments this detection may be carried out in an automatic or substantial automatic manner and if desired on large-scale data. Certain applications are directed to analysing video surveillance records to identify aberrant behaviour among small numbers of individuals in a crowd. Certain applications are directed to analysing data streams from large-scale sensor networks and/or large on-line databases. In certain embodiments, the disclosure is to methods and/or systems of detecting anomalies from data; including large-scale data. Certain applications may be carried out in real time or substantially real time.

BACKGROUND

Anomalous event detection from video data is a complex problem that has been the subject of investigation over the past decade. The number of surveillance cameras in the public domain is large, and as a result it is practically often impossible to manually monitor the video streams from all the cameras. As a result there is a pressing need for automatic, or substantially automatic, and/or scalable detection of abnormal events from video streams. There is also a pressing need to for being able to do this in substantially real time, in real-time, or in an acceptable time period.

The literature on abnormal event detection can be generally classified into two main streams: model-based and statistical-based approaches.

In the model-based approach, image features associated with behaviours such as the trajectory or shape of moving objects are extracted from video data. Then, typically a supervised learning step is performed to learn the behaviour model given the observed features. This model can then be used at the inference stage to decide whether the current scene is abnormal. Parametric and nonparametric spatio-temporal template methods are proposed and describe a boosting-based classifier for the inference step. A large body of model-based methods also consider the trajectories of moving objects as image features for behaviour analysis.

The second approach is based on statistical analysis of the whole scene rather than focusing on individual targets. This approach makes use of low-level information about the images in conjugation with statistical methods for event detection. The main advantages of this approach are simplicity, since low-level features can be easily computed, and reliability, since their computation is invariant to environmental constraints. As a result, statistical methods may be more robust and reliable, and can be deployed in real-world applications.

Examples of low-level image features are SIFT, interest points, salient and region detectors. The learning methods for low-level image features include the use of support vector machines (SVM), probabilistic latent semantic analysis (PLSA) and kernel learning. For example, using an ensemble of image patches to learn the irregularities in the video; modelling exemplar activities in the video using principal component analysis; and using volumetric feature based optical flow representation for activity recognition in video.

The existing literature on the statistical-based approach has shown some success even in real-world scenarios. However these methods are restricted to abnormal events associated with the main characteristics of the scene, which also may be call principal behaviour. For example, constructing the prototype-segment co-occurrence matrix, whilst looking for significant aggregate changes from pre-defined multiple locations.

One of the challenging problems for practical public surveillance interest is the detection of anomalous behaviour from one or few individuals in the presence of a large number of people behaving normally. Current statistical-based methods are unable to detect these types of anomalies. For example, current methods cannot detect a loitering person in a crowd.

In addition, the problem of detecting anomalies in data streams captured by large-scale sensor networks has received much interest over the past decade. As large-scale networks become prevalent, there is an increasing need to develop approaches that can address the challenges arising from the collection of large amounts of data. The problem affects a wide range of applications as the data captured by sensor networks could constitute multimedia content from the web, video from surveillance camera networks, satellite imagery or typical network traffic.

There have been several approaches to detect different types of anomalies developed for either databases or data streams in the past years, however these techniques generally share an important assumption that the complete data is available.

As network size increases, it becomes increasingly difficult to acquire all the data streams for processing. Hence, in large-scale networks, the complete data may not be always available at the fusion point for detecting anomalies because of either low bandwidth or large geometrical distances between sensors.

A number of proposals have been introduced to address the challenges in acquiring information about networks to circumvent the physical bandwidth constraints. One notable approach is decentralization. For example, one proposed approach is a decentralization method for streaming data in which the sensors only send information to the fusion point if the observed value falls outside the normal range, which is a typically pre-defined window. If a sensor does not send any data, the fusion point will assume a nominal value.

Another technique is column sampling, which is typically only suitable for static database applications. In this selective sampling approach, an empirical distribution over the columns of is constructed and a small number of columns are selected based on sampling from the empirical distribution.

Another concern for sensor network applications is the scalability of the computational framework that involves answering the queries with low latency. The computational complexity for processing the data stream is a function of length L and the dimension N of input data. In most cases, the computational complexity is quadratic with either L or N. In some cases, it can be linear with L, but this requires iterative estimation, for example, expectation maximization (EM) to reach convergence. The EM method also linearly scales with the sample size, but on average it has very slow convergence rates and is typically not suitable for anomaly detection in high speed data streams.

The anomaly detection methods mentioned above do not address the issue of high dimensionality of input data, the exception being spectral approaches. The assumption behind the spectral approaches has been motivated by the low-dimensional intrinsic structure of the input data. It should be noted that certain spectral methods may work well for small scale problems when the full dataset is available but are not applicable for large-scale problems when the full data matrix is not available.

SUMMARY

Certain applications of the present disclosure allow multiple complex data streams with varying quantitative characteristics to be analysed such that abnormal behaviour is automatically, or substantially automatically identified. In some applications this may be done in real time or in substantially real time. In other applications this may be done off-line or in less then real time. The methods and systems disclosed may be use in the in the field of video analytics as well as a number of other fields and applications.

The methods and systems disclosed have one more advantages over the existing prior art. For example, with respect to existing video analytics applications:

Certain embodiments do not require differentiate objects within the view of the camera;
Certain embodiments require very limited manual installation or set-up;
Certain embodiments train by defining what is normal as opposed to defining what is abnormal at the beginning;
Certain embodiments once provided sample data to establish the parameters of normal will automatically identify (to a system or user defined level) any weird or exceptional motion on the video stream;
Certain embodiments do not require pre-programmed events to be determined or defined for detection;
Certain embodiments will detect anomalies which may never have been foreseen or pre-defined by the customer of the application software;
Certain embodiments are more processor efficient than current systems for real time reporting of events (primarily because tracking, segmentation and object identification may not be required);
Certain embodiments save money on processing and/or provide greater processing efficiency; and/or
Certain embodiments are highly scalable and able to process large numbers of cameras/data using a compressive sensing approach. These and other advantages and improvements are contemplated.

In addition, there may be one or more benefits to the customer and/or end-user including, but not limited to:

Within the video analytics space it replaces multiple existing video analytics products;
Saves money for customers;
Improves performance in existing systems;
Improves efficiency;
Improves operation of systems by providing real time or substantially real time performance;
Has no complicated set-up costs, as the system can be self learning from historical data without difficult rule definitions; and/or
Replaces employee monitoring and surveillance work which are expensive, untimely and/or error-prone.

Certain embodiments can operate as machine readable code, this code may reside on a Server, Personal Computer, larger computer, smaller computer, a mobile device (such as a PDA or iPhone), or sensors (including within cameras/digital devices/wearable or implanted sensing device).

Data streams can be segmented into datasets based on time periods—for example, day, night, parts of the day etc. Of course other examples exist for the training phase. The disclosed methods and/or systems can be applied on a data subset.

In certain aspects, the one or more features may be one or more variables associated with a subset. For video data an example of a feature is the grey level, or colour intensity; and the anomaly may be an event being filmed. For sensor data an example of a feature is the data volume; and the anomaly may be an event being recorded in the data.

In certain aspects, a feature could also be the difference in parameters between two subsets of the data. In this case the analysing step may be applied to the difference between pairs of subsets; know generically as flow. In the case of video this is known as optical flow. Of course, other examples exist for features.

Using certain embodiments disclosed herein, real-world data sets may be processed to detect anomalies or infrequent events. For instance, but not limited to:

Video surveillance data;
Sonar data;
Road traffic data;
Local or Wide area network traffic data;
Agricultural sensor networks;
Medical imaging data;
Telecommunications traffic data; or
Astronomical data.

In certain aspects, when the data is a stream of video surveillance data, each subset may be a frame and a feature might be motion information between each successive pair of frames that is analysed to detect abnormal behaviour, of both individuals and groups, in the presence of normal behaviour in a large crowd of people. Of course, other examples exist for features.

In some embodiments, the analysis of optical flow may involve dividing each frame (image), or sufficient frames, of video by a grid into cells, and then counting the number of optic flow vectors in each cell. This technique provides useful information about motion whilst alleviating the need for object tracking and can be easily computed. Of course, other examples exist for analysis.

In some embodiments, this optical flow may be represented using bag-of-visual-words. From the bag-of-visual-words a feature-frame matrix may be constructed by amalgamating the feature vectors for all, substantially all or sufficient frames in the sequence. This is similar to the term-document matrix in document analysis and can be decomposed using SVD in a similar manner. Of course, other examples exist for aggregation. The aggregate behaviour represented in this way may then be structurally decomposed into the observed into principal and residual components. Then it is possible to detect abnormal events in the residual subspaces (nullspace of the normal events). The threshold in the residual space may be calculated using the Q-statistic. Of course, other examples exist for threshold determination. The location of the anomaly within the data set may be specifically identified to separate it from normal behaviour within that same dataset.

An example, according to certain embodiments, might be the identification of a single person loitering in an airport concourse, from large-scale public transport surveillance video data. In this example, the detection of anomalous events is performed on the null space of the normal events. Subsequent readouts may involve displaying the image and grid from an oblique angle and superimposing a bar representing the number of optic flow vectors on each cell; see for instance FIG. 2(b). Such methods and/or systems can be used as alert mechanisms from which necessary security responses can be formulated.

The detection of abnormal behaviour by this method is highly sensitive and may be possible regardless of whether the abnormal behaviour is central to, or mixed within, other normal behaviour within the image frame. For example the anomaly observed over a crowded video scene may be in the middle of the crowd, or at its periphery.

The technique is suitable for detecting abnormal behaviour from, among others, large-scale public transport surveillance video data. In certain applications, the disclosed methods may require the analysis of several days of surveillance video footage to extract the patterns of normal behaviour. The anomalous behaviours will typically have duration of several seconds or more depending on what anomalous behaviour is detected.

In certain applications, when dealing with large-scale data in general, it may not be possible, or desirable, to receive or process the whole, or a substantial portion, of the data to detect anomalies. In some applications, it may be useful to employ a pre-cursor step to transform the data to the Compressed Domain, using Compressed Sensing (CS) that involves multiplication of the data subsets with a sensing matrix. Compression Sensing is designed to reduce the data to a manageable size. The analysing and other steps are then all performed on the compressed data. This may greatly reduce the number of processing samples while retaining good anomaly detection performance. In certain embodiment, with high probability the anomaly detection performance is approximately equivalent to that on complete data, provided that the data spectrum is sparse. This is the case in many practical situations. In other applications, the detection performance using the Compressed Domain may provide sufficient equivalents so as to be practically useful with something less than a high probability.

The compressed sensing may be deployed for reducing the feature dimension or time instances, or both, in the compressed domain to reduce the volume of data to be processed. Of course, other examples exist for the way in which compressed sensing can be applied.

For example, for reducing the feature dimension a useful sensing matrix has entries with values of either 0 with probability 2/3 or +/−1 with probability 1/6. If all sensors have synchronized clocks and the same random generator, a rule can be set up so that the sensors send their pre-modulated reading with +/−1 depending on the value of the random generator.

Alternatively, in certain applications, when the sensors cannot directly reach the central node such as in a wireless communication link over a large spatial domain, the random gossip algorithm can be applied to propagate the projection to the central node.

For reducing the temporal stream, for instance by frame sub-sampling, an operator can request the server to generate random numbers and select instances corresponding to the random values +/−1, sum these two sets of instances, subtract them, and iteratively send the (very much fewer) results to the operator.

In each case the data is processed to transform the data into a different state where anomalies are revealed. The anomalies themselves represent happenings in the real world source of the data; for instance real world traffic irregularities.

Alternatively, the features may be represented as sets of vectors before being transformed to the Compressed Domain. Then the decomposing step is performed on the sets of compressed vectors to extract the residual subspace, before thresholding the compressed data. Of course, other examples exist for feature transformation.

Certain embodiments are directed to a method or methods for processing, detecting and/or notifying for the presence of at least one infrequent event from at least one large scale data set comprising: receiving time series data; representing either the time series data, or one or more features of the time series data, as sets of vectors, matrices and/or tensors; performing compressive sensing on the at least one vector, matrix and/or tensor set; decomposing the selected sets of compressive sensed vectors, matrices and/or tensors to extract the residual subspace; identifying potential infrequent events by analysing compressive sensed data projected into the residual subspace.

In certain aspects, the one or more features of the time series data are one or more variables associated with a subset of the time series data. In certain aspects, the one or more features of the time series data are the difference in any variable between any two subsets of the data of the time series data. In certain applications, the time series data is a stream of at least one of video and audio surveillance data, each subset is a frame and the feature is a motion or frequency information between each successive pair of frames.

In certain aspects, the analysis (of optical flow) involves dividing each frame of video by a grid into cells, and then counting the number of optic flow vectors in each cell.

In certain applications, the optical flow is represented using bag-of-visual-words. In certain aspects, from the bag-of-visual-words a feature-frame matrix is constructed by amalgamating the feature vectors for all frames in the sequence.

In certain applications, the feature-frame matrix is then structurally decomposed into the observed into principal and residual components.

In certain aspects, the method or methods further comprising detecting abnormal events in the residual subspaces using the Q-statistic.

In certain applications, a pre-cursor step is employed to transform the data to the Compressed Domain, to reduce the data to a manageable size.

In certain aspects, the transformation is deployed for reducing the feature dimension in the compressed domain and employs a sensing matrix having entries with values of either 0 with probability 2/3 or +/−1 with probability 1/6.

In certain applications, a random gossip algorithm is applied.

In certain aspects, the transformation is deployed for reducing the time instances in the compressed domain and employs frame sub-sampling.

In certain aspects, the features are represented as sets of vectors before being transformed to the Compressed Domain.

In certain aspects, identifying potential infrequent events involves thresholding the data projected into the residual sub-space.

Certain embodiments, are to methods of detecting potential anomalies from data comprising a time series of data subsets; the method comprising the steps of: receiving data comprising a time series of data subsets; analysing one or more features in the time series of data subsets; representing the one or more features as sets of vectors; decomposing the sets of vectors to extract at least one subspace; and thresholding the data projected into the at least one subspace to identify potential anomalies.

Certain embodiments are to methods for processing, detecting and/or notifying for the presence of at least one infrequent event from at least one large scale data set comprising: receiving time series data; representing either the time series data, or one or more features of the time series data, as sets of vectors, matrices and/or tensors; performing compressive sensing on the at least one vector, matrix and/or tensor set; decomposing the selected sets of compressive sensed vectors, matrices and/or tensors to extract the residual subspace; identifying potential infrequent events by analysing compressive sensed data projected into the residual subspace.

Certain embodiments are directed at systems of detecting potential anomalies from data comprising a time series of data subsets; the system comprising:
  means for receiving data comprising a time series of data subsets;
  means for analysing one or more features in the time series of data subsets;
  means for representing the one or more features as sets of vectors;
  means for decomposing the sets of vectors to extract the residual subspace; and
  means for thresholding the data projected into the residual subspace to identify potential anomalies.

In certain embodiments, compressive sensing can be applied at the central processor, or across the network and anomaly detection performed at the central processor. Alternatively, the compressive sensing and anomaly detection can be applied at the sensor and only anomalous frames transmitted to the central processor. The present disclosure contemplates various combinations of where the various steps of the disclosed systems and methods are performed. These alternative configurations would be understood by those skilled in the art. Certain embodiments are to a system comprising:
  at least one sensor to receive data comprising a time series of data subsets for analysis;
  a computer memory for storing the data;
  a computer processor for:
    representing either the time series data, or one or more features of the time series data, as sets of vectors, matrices and/or tensors,
    performing compressive sensing on the at least one vector, matrix and/or tensor set;
    decomposing the selected sets of compressive sensed vectors, matrices and/or tensors to extract the residual subspace; and
    identifying potential infrequent events by analysing compressive sensed data projected into the residual sub-space.

Certain embodiments are to a system comprising:
  at least one sensor to receive data comprising a time series of data subsets for analysis;
  a computer memory for storing the data;
  a computer processor comprising:
    means for representing either the time series data, or one or more features of the time series data, as sets of vectors, matrices and/or tensors,
    means for performing compressive sensing on the at least one vector, matrix and/or tensor set;
    means decomposing the selected sets of compressive sensed vectors, matrices and/or tensors to extract the residual subspace; and
    means for identifying potential infrequent events by analysing compressive sensed data projected into the residual sub-space.

In certain embodiments of the system, the computer processor is co-located with the at least one sensor.

In certain embodiments of the system, the computer processor is remotely located from the at least one sensor.

In certain embodiments of the system, wherein a portion of the computer processor is remotely located from the least one sensor and performs the step of identifying potential infrequent events by analysing compressive sensed data projected into the residual sub-space.

In certain embodiments of the system, the functionality of the computer processor can be divided between a sub-processor co-located with the at least one sensor and a sub-processor remotely located from the at least one sensor.

Certain applications are to a system for processing, detecting and/or notifying for the presence of at least one potential anomaly from large scale data sets comprising: at least one sensor to receive data comprising a time series of data subsets for analysis; at least one processor that receives time series data; at least one processor that represents either the data or one or more features of the data as sets of vectors; at least one processor that performs compressive sensing on at least one of the sets of vectors; at least one processor that then decomposes the selected vectors to extract the residual subspace; and at least one processor that then thresholds the compressive sensed data projected into the residual subspace to identify potential anomalies.

Certain embodiments are to a system that can detect infrequent events in substantially real time comprising: at least one large scale sensor network that provides time series data from at least one sensor in the network; and at least one processor that provides:
  means for receiving time series data in substantially real time from at least one sensor in the network;
  means for representing either the data, or one or more features of the time series data as sets of vectors, matrices and/or tensors;
  means for performing compressive sensing on the at least one vector, matrix and/or tensor set and then means for decomposing the selected sets of compressive sensed vectors, matrices and/or tensors to extract at least one subspace; and
  means for identifying potential infrequent events by analysing compressive sensed data projected into the at least one sub-space.

Certain embodiments are to a system that can detect infrequent events in substantially real time comprising: at least one large scale sensor network that provides time series data from at least one sensor in the network; at least one processor that:
  receives time series data in substantially real time from at least one sensor in the network;
  represents either the data, or one or more features of the time series data as sets of vectors, matrices and/or tensors;
  performs compressive sensing on the at least one vector, matrix and/or tensor set and then decomposes the selected sets of compressive sensed vectors, matrices and/or tensors to extract at least one subspace; and
  identifies potential infrequent events by analysing compressive sensed data projected into the at least one sub-space.

In certain applications, the at least one large scale sensor network is made up of at least 60, 100, 200, 300, 400, 500, 600, 700, 800, 900, 1000, 2000, 5000, 10,000 or 20,000 sensors. In certain aspects, the system processes the time series data in a cost effect manner. In certain aspects, the subspace is the principal subspace. In certain aspects, the subspace is the residual subspace. In certain aspects, the subspace is selected from the principal subspace, the residual sub space or combinations thereof.

Certain embodiments are to methods and/or systems of substantially automatically detecting anomalies from data comprising a time series of data subsets, comprising the steps of receiving data comprising a time series of data subsets; analysing one or more features in the time series of data subsets; representing the one or more features as sets of vectors; decomposing the sets of vectors to extract the residual subspace; thresholding the data projected into the residual subspace to identify potential anomalies; and generating at least one readout that identifies the anomalous behaviour.

Certain embodiments may be used within existing devices, sensors and/or systems.

The applicable prior art systems and methods require the specification of what is anomalous event detection. In contrast, certain disclosed systems and methods require the specification of what is normal. Certain embodiments function by looking in the residue subspace and ignoring the principal sub space. Certain embodiments are directed to methods for detecting infrequent events without the need to specify the characteristics of the infrequent events prior detection comprising the steps of: receiving time series original data; representing either the data or one or more features of the data as sets of vectors; performing compressive sensing on at least one of the sets of vectors; decomposing the sets of compressive sensed vectors to extract the principle subspace; and identifying infrequent events in compressive sensed data projected into the principle subspace.

Certain embodiments are to a method or methods for detecting infrequent events from video data comprising: extracting first time series data from a video stream; amalgamating the first time series data using grid based representations; constructing at least one motion vector based at least in part on the amalgamated first time series data; processing the at least one motion vector based at least in part on the amalgamated first time series data to determine a residual subspace and a principal subspace; determining a threshold value for the residual subspace; extracting second time series data from a video frame of the video stream; amalgamating the second time series data using grid based representation; constructing at least one motion vector based at least in part on the amalgamated second time series data; comparing the at least one motion vector based at least in part on the amalgamated second time series data with the threshold value; and identifying an infrequent event if the at least one motion vector based at least in part on the amalgamated second time series data is greater than the threshold value.

Certain embodiments are to methods for detecting infrequent events from video data comprising: extracting first time series data from a video stream; amalgamating the first time series data using grid based representations; constructing at least one motion vector based at least in part on the amalgamated first time series data; performing compressive sensing on the at least one motion vector based at least in part on the amalgamated first time series data; processing the at least one compressed motion vector based at least in part on the amalgamated first time series data to determine a residual subspace and a principal subspace; determining a threshold value for the residual subspace; extracting second time series data from a video frame of the video stream; amalgamating the second time series data using grid based representation; constructing at least one motion vector based at least in part on the amalgamated second time series data; performing compressive sensing on the at least one motion vector based at least in part on the amalgamated second time series data; comparing the at least one compressed motion vector based at least in part on the amalgamated second time series data with the threshold value; and identifying an infrequent event if the at least one compressed motion vector based at least in part on the amalgamated second time series data is greater than the threshold value.

Certain embodiments are directed to a method or methods for detecting infrequent events from a data stream from non-network data comprising: extracting first features of the data from the data stream; amalgamating the first features using grid based representations; constructing at least one features vector based at least in part on the amalgamated first features; processing the at least one features vector based at least in part on the amalgamated first features to determine a residual subspace and a principal subspace; determining a threshold value for the residual subspace; extracting second features data from a data frame of the data stream; amalgamating the second features data using grid based representation; constructing at least one features vector based at least in part on the amalgamated second features data; comparing the at least one features vector based at least in part on the amalgamated second features data with the threshold value; and identifying an infrequent event if the at least one feature vector based at least in part on the amalgamated second features data is greater than the threshold value.

Certain embodiments are directed to a method or methods for detecting infrequent events from a data stream comprising: extracting first features of the data from the data stream; amalgamating the first features data using grid based representations; constructing at least one features vector based at least in part on the amalgamated first features data; performing compressive sensing on the at least one features vector based at least in part on the amalgamated first features data; processing the at least one compressed features vector based at least in part on the amalgamated first features data to determine a residual subspace and a principal subspace; determining a threshold value for the residual subspace; extracting second features data from a data frame of the data stream; amalgamating the second features data using grid based representation; constructing at least one features vector based at least in part on the amalgamated second features data; performing compressive sensing on the at least one features vector based at least in part on the amalgamated second features data; comparing the at least one compressed features vector based at least in part on the amalgamated second features data with the threshold value; and identifying an infrequent event if the at least one compressed features vector based at least in part on the amalgamated second features data is greater than the threshold value.

In certain applications it is possible to combine compressed sensing with other detection methods and still obtain acceptable results using the certain embodiments disclosed herein. For example, a method for processing, detecting and/or notifying for the presence of at least one infrequent event from at least one large scale data set comprising: receiving time series data; representing either the data, or one or more features of the time series data as sets of vectors, matrices and/or tensors; performing compressive sensing on the at least one vector, matrix and/or tensor set; computing detection statistics using the compressive sensed data through other statistical methods or machine learning methods; and identifying potential infrequent events by analyzing the detection statistic.

The methods and systems disclosed provide for much more robust processing and detection of infrequent events in real time, or substantially real time, using fairly standard equipment. These methods and systems save money on processing and/or provide greater processing efficiency then is presently known under certain specified parameters. These methods and systems also reduce the complication of set-up costs.

In certain applications, where no compressed sensing is being used, it is still possible to process a significant amount of data per second under defined parameters. Certain embodiments are to a method, or methods, for detecting the presence of an infrequent event, the method comprising: monitoring a data set using a plurality of sensors; and processing, the data received by the sensors to detect the presence of the infrequent event in substantially real time; wherein the manner in which the data is processed supports substantially real time analysis of about 164 Mb/second using an Intel Core™ 2 Duo 3 Ghz Processor. In certain aspects, the method is able to handle 140, 150, 160, 170, 180, or 190 Mb/second. In certain applications, where no compressed sensing is being used, it is still possible to handle a significant number of sensors in real time or substantially real time. Certain embodiments are to a method, or methods, for detecting the presence of an infrequent event, the method comprising: monitoring a data set using a plurality of sensors; and processing, the data received by the sensors to detect the presence of the infrequent event in substantially real time; wherein the manner in which the data is processed supports substantially real time analysis of data obtained from 20 sensors using an Intel Core™ 2 Duo 3 Ghz Processor. In certain aspects, the method is able to handle 15, 20, 25, 30, or 35 sensors. Certain methods are to a method, or methods, for detecting the presence of an infrequent event in a video feed, the method comprising: monitoring a video feed using a plurality of cameras; and processing, the data received by the cameras to detect the presence of the infrequent event in substantially real time; wherein the manner in which the data is processed supports substantially real time analysis of data obtained from 20 cameras at a frame rate of 10 frames/second with resolution (356*288) (8 bits) using an Intel Core™ 2 Duo 3 Ghz Processor. This assumes that the feature extraction is performed on the same processor that is also computing the anomaly detection. If the feature extraction is performed in another processor, then the manner in which the data is processed supports substantially real time analysis of about 16,400 Mb/second using an Intel Core™ 2 Duo 3 Ghz Processor. In certain aspects, the method is able to handle 14,000, 15,000, 16,000, 17,000, 18,000, or 19,000 Mb/second. If the feature extraction is performed in another processor, then the manner in which the data is processed supports substantially real time analysis of data obtained from 2000 sensors using an Intel Core™ 2 Duo 3 Ghz Processor. In certain aspects, the method is able to handle 1500, 2000, 2500, 3000, or 3500 sensors.

In certain applications, where compressed sensing is being used, it is possible to process a significant amount of data per second under defined parameters. Certain embodiments are to a method, or methods, for detecting the presence of an infrequent event, the method comprising: monitoring a data set using a plurality of sensors; and processing, the data received by the sensors to detect the presence of the infrequent event in substantially real time; wherein the manner in which the data is processed supports substantially real time analysis of about 500 Mb/second using an Intel Core™ 2 Duo 3 Ghz Processor. In certain aspects, the method is able to handle 400, 450, 500, 550, or 600 Mb/second.

In certain applications, where compressed sensing is being used, it is still possible to handle a significant number of sensors in real time or substantially real time. Certain embodiments are to a method, or methods, for detecting the presence of an infrequent event, the method comprising: monitoring a data set using a plurality of sensors; and processing, the data received by the sensors to detect the presence of the infrequent event in substantially real time; wherein the manner in which the data is processed supports substantially real time analysis of data obtained from 60 sensors using an Intel Core™ 2 Duo 3 Ghz Processor. In certain, aspects the method is able to handle 50, 60, 70, 80, or 90 sensors. Certain embodiments are to a method, or methods, for detecting the presence of an infrequent event in a video feed, the method comprising: monitoring a video feed using a plurality of cameras; and processing, the data received by the cameras to detect the presence of the infrequent event in substantially real time; wherein the manner in which the data is processed supports substantially real time analysis of data obtained from 60 cameras at a frame rate of 10 frames/s with resolution 356*288) (8 bits) using an Intel Core™ 2 Duo 3 Ghz Processor. This assumes that the feature extraction is performed on the same processor that is also computing the anomaly detection. If the feature extraction is performed in another processor, then the manner in which the data is processed supports substantially real time analysis of about 50,000 Mb/second using an Intel Core™ 2 Duo 3 Ghz Processor. In certain aspects, the method is able to handle 40,000, 45,000, 50,000, 55,000, or 60,000 Mb/second. If the feature extraction is performed in another processor, then the manner in which the data is processed supports substantially real time analysis of data obtained from 6000 sensors using an Intel Core™ 2 Duo 3 Ghz Processor. In certain, aspects the method is able to handle 5000, 6000, 7000, 8000, or 9000 sensors.

Certain embodiments are directed to computer systems for substantially automatically detecting anomalies from data, comprising:
  an input port and means to receive data comprising a series of data subsets for analysis;
  a computer memory and means for storing the data;
  a computer processor comprising:
  i. means for analysing one or more features in the time series of data subsets;
  ii. means for representing the features as sets of vectors;
  iii. means for decomposing the sets of vectors to extract the residual subspace; and
  iv. means for thresholding the data projected into the residual subspace to identify potential anomalies.

Certain embodiments are directed to computer systems for substantially automatically detecting anomalies from data, comprising:
  an input port to receive data comprising a series of data subsets for analysis;
  a computer memory for storing the data;
  a computer processor for performing the steps:
  v. analysing one or more features in the time series of data subsets;
  vi. representing the features as sets of vectors;
  vii. decomposing the sets of vectors to extract the residual subspace; and
  viii. thresholding the data projected into the residual subspace to identify potential anomalies.

BRIEF DESCRIPTION OF THE DRAWINGS

Additional features and advantages of the present disclosure will become apparent from the detailed description of the embodiments in conjunction with the accompanying drawings.

FIG. 11(a) is a plot of Eigen values for the $X_{Test2}$ data using PCA, in accordance with certain embodiments.

FIG. 11(b) is a plot of Eigen values for the $X_{Test2}$ data using R-PCA.

DETAILED DESCRIPTION

Figure 1:
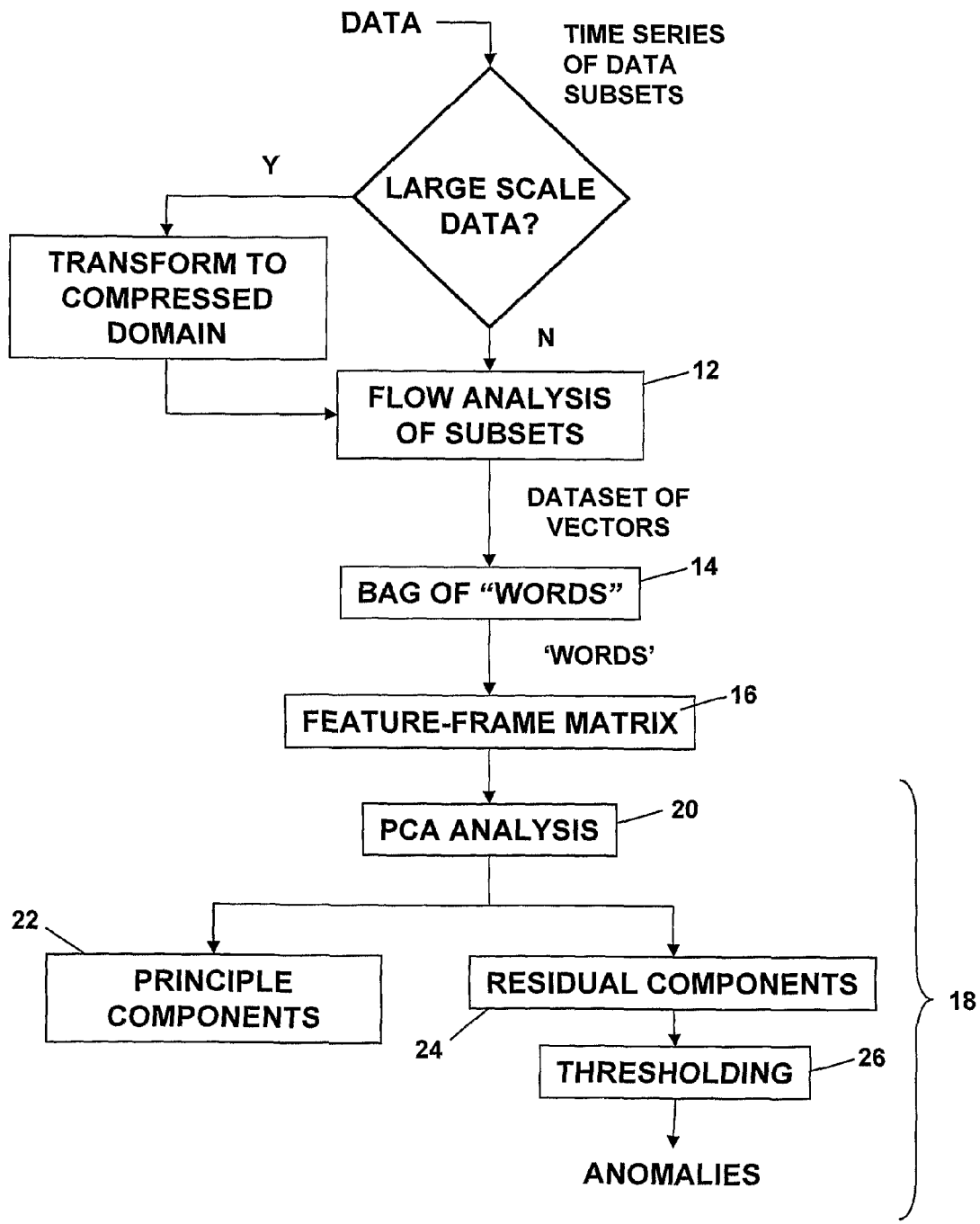
FIG. 1 is flow diagram of process for detecting anomalies from data comprising a time series of data subsets, in accordance with certain embodiments.

FIG. 1 is flow diagram of a process for detecting anomalies from data comprising a time series of data subsets. Referring first to FIG. 1, in this example, the data may be video surveillance data streaming from a video camera. The data has the form of a time series of subsets, each subset containing a frame of video data. The data is typically stored for future use or transmitted across a network to a computer system for analysis.

At the computer system the data is received and applied to a processor. An anomaly detection framework is developed by considering the motion statistics in the spatio-temporal domain 12. Each image is divided by a grid into cells, and the motion statistics for each cell in every image are then computed over a pre-defined time bin. The motion distribution of each cell is simply calculated as the number of optic flow vectors in that cell. In particular, as shown in FIG. 1, when the data arrives at the processor, the processor determines whether the received data is large scale. If the data is large scale, the data is transformed to a compressed domain before a flow analysis 12 is performed. The flow analysis produces at least one set of vectors which are processed using, for example, the bag-of-visual-words model 14. The "words" which are generated are then used to generate a feature-frame matrix 16.

The PCA analysis 20 identifies 18 the principle components 22 and the residual components 24 and the residual components are compared to a threshold value to determine whether an anomaly exists 26.

Figure 2A:
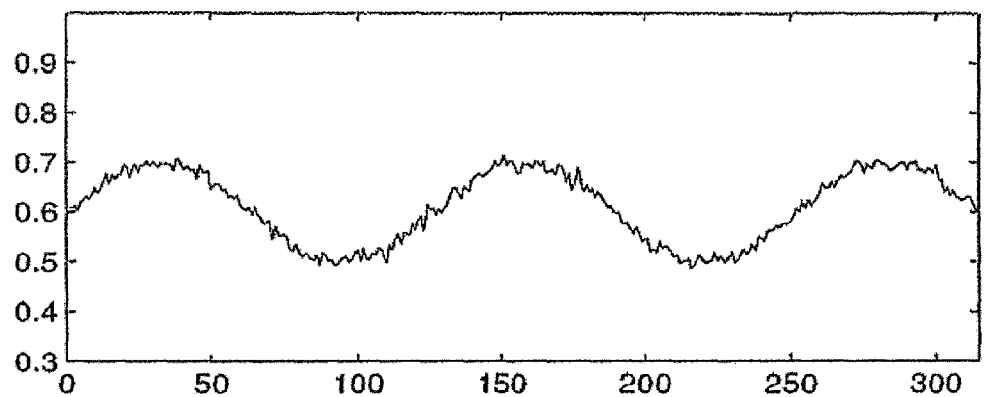
FIG. 2(a) is a plot showing an amalgamated optical flow for a sequence of normal behaviour here each observation corresponds to the motion statistics computed over one minute interval in accordance with certain embodiments.

FIG. 2(a) shows the amalgamated motion flows over 300 frames over a first sequence of data collected from surveillance cameras in a train station. Specifically, the figure plots the volume of the motion flows, which is the squared norm of the vector of motion statistics from all cells, for the data captured in train station subway over 5 hours of a day. Each point on the graph shows the motion statistics amalgamated over one minute. Generally, the characteristics of this normal motion volume is high if there is a train in the station, otherwise it remains low giving rise to almost periodic rise and fall.

The aim is to detect abnormal events both in the presence and absence of normal activities. The motion distribution of each cell in different traffic scenarios is considered. The normal activities include heavy people traffic coming in through the entry point and going out by exit point during peak hours. They also include few objects or almost no objects in off-peak hours.

Figure 2B:
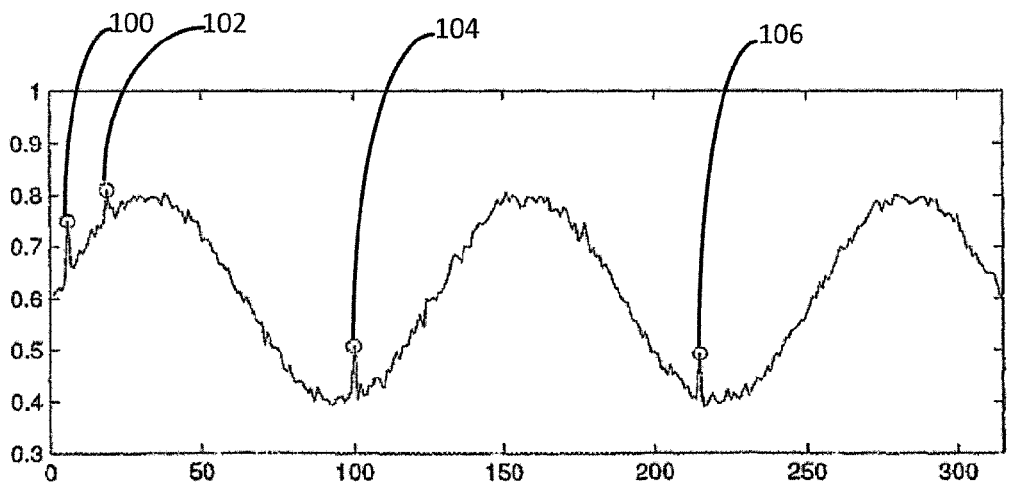
FIG. 2(b) is a plot showing an amalgamated optical flow for a sequence of abnormal behaviour where each observation corresponds to the motion statistics computed over one minute interval.

Any significant change in the motion volume statistics in the spatio-temporal domain may be treated as unusual and is a potential candidate for being an anomaly. FIG. 2(b) is a second sequence where such unusual changes in the motion volume statistics are visible; see 100, 102, 104 and 106.

Figure 3A:
FIG. 3(a) is a gridded frame of video where there is normal crowd activity, in accordance with certain embodiments.
Figure 3B:
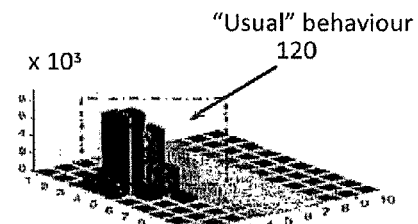
FIG. 3(b) is a plot of the motion distributions of 100 frames of the normal crowd activity showing the crowd is dense.

Referring now to FIG. 3, some typical examples will be described:

EXAMPLE 1. FIG. 3(a) shows one frame of the normal activities in a crowd. The frame is gridded into cells. FIG. 3(b) plots the motion distributions in each cell for 100 frames of normal sequences. It can be seen by the amplitude of the cluster of bars 120 in some cells of FIG. 3(b) that the crowd is dense.

Figure 3C:
FIG. 3(c) is a gridded frame of video where there is normal crowd activity plus a single person leaning against a wall.
Figure 3D:
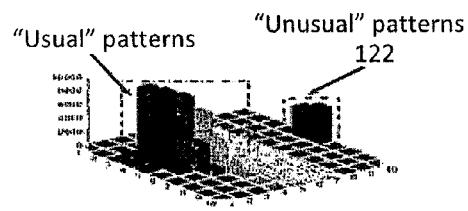
FIG. 3(d) is a plot of the motion distributions of 100 frames of normal crowd activity with the single person leaning against the wall.

EXAMPLE 2. FIG. 3(c) also shows one frame of a sequence in which a person leans against the wall in presence of normal crowd for some time. Again the cell in gridded into cells and FIG. 3(d) shows the motion distribution of each cell in a 100 frame sequence. Visually, there is a contrast between the structural characteristics of the distributions of FIGS. 3(b) and (d) because the "abnormal" (e.g. leaning) activities of FIG. 3(c) appear as a second cluster of bars 122 in FIG. 3(d).

Figure 3E:
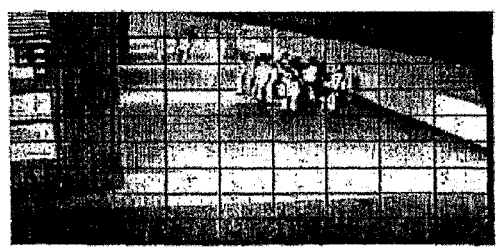
FIG. 3(e) is a gridded frame of video where there is normal crowd activity.
Figure 3F:
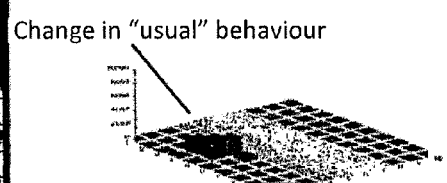
FIG. 3(f) is a plot of the motion distributions of 100 frames of normal crowd activity.

EXAMPLE 3. FIG. 3(e) again shows one frame of the normal activities in a crowd. In this case a group of people are loitering around and the motion volume is low. FIG. 3(f) shows the corresponding plot motion distributions, which can be seen to have less amplitude than FIG. 3(b).

In a subway, passengers would normally follow the "walk" path to enter and exit. These normal activities induce a distribution of motion vectors over the cells in the subway. Importantly, this distribution also signifies the relationship between the cells. For example, some cells tend to be highly correlated due to the average flow of the traffic through the cells. This dependence gives important information about the structural pattern of normal events. Thus, if, for example, a person or a group transversely crosses the subway, the observed motion distribution will carry totally new structural information and that is the basis for abnormality detection.

Similarly, a loitering person is likely to lead to the observation that the cells covering the loitering trajectory become more correlated than normal. If this structural information is known, the normal activity can be separated by projecting the observed motion pattern onto the space induced by the structure, so that abnormal activities can be more easily investigated in the residual subspace.

Bag-of-visual words is used to represent the optic flow count in the cells. Using an approach that derives visual words from the human activity in the spatio-temporal domain. Using a grid-based approach optic flow counts for each cell can be extracted. Each cell is considered similar to a term and motion statistics, such as the number of motion flows, of each cell as equivalent to word frequency. The number of terms is therefore equal to the number cells in the image. A feature-frame matrix 16 is constructed in an analogous manner to the term-document matrix. Denoting the number of cells as N and the motion statistics of EQ $x(l)=[x(1)(l), \ldots, x(N)(l)]^T$. For a sequence of L frames, the EQ $X=[x(1), \ldots, x(L)]$. In document analysis, the semantic variables (topics) govern the probabilistic occurrence of the terms. Similarly in certain disclosed applications, the structural variables of the normal behaviour govern the distribution of motion vectors over cells.

To find the structural information of the normal activities, the residual subspace analysis method is used. From the feature-frame matrix X, the sample covariance matrix can be estimated as $\Sigma_X=(1/L)XX^T$ after X is centralized. Suppose the eigenvalue decomposition EQ $\Sigma(x)=U\Lambda U^{(T)}$, the principal subspace is associated with the K principal EQ $\lambda(1), \ldots, \lambda(K)$. The projection into the residual subspace 24 is defined as $P=I-U_K U_K^T$. For any observed motion pattern x, the normal component is $U_K U_K^T x$ whilst the residual component is $z=Px$. The key difference to previous statistical-based methods is that we propose to detect abnormal activities in the residual subspace by considering the squared prediction error (SPE) statistic 26

$$t_{SPE}=\|z\|_2^2=\|(I-U_K U_K^T)x\|_2^2. \quad (1)$$

If z follows a multivariate normal distribution, the SPE statistic follows a non-central chi-square distribution under the null hypothesis that the data is normal. Hence, rejection of the null hypothesis can be based on whether $t_{SPE}$ exceeds a certain threshold corresponding to a desired false alarm rate β. In reference [9], the Q-statistic is used to compute the threshold, which involves the largest K eigenvalues as follows:

$$Q_\beta = \Phi_1\left(\frac{c_\beta\sqrt{2\Phi_2 h_0^2}}{\Phi_1}+1+\frac{\Phi_2 h_0(h_0-1)}{\Phi_1^2}\right)^{\frac{1}{h_0}} \quad (2)$$

where, $$h_0 = 1 - \frac{2\theta_1\theta_3}{3\theta_2^2}, \theta_i = \sum_{j=K+1}^{N} \lambda_j^i$$

for i=1, 2, 3, $c_\beta=(1-\beta)$ percentile in a standard normal distribution. An abnormal activity is detected when $t_{SPE}>Q_\beta$.

In certain applications, the analysis on residual subspace to detect anomalies is only effective when the number of principal components K is sufficiently small. Otherwise, the power of the anomalous activities will spread considerably into the principal subspace, implying low detectability. Fortunately, the assumption of small K appears to be satisfied very well in practice.

To characterize the principal subspace, it is desirable in certain embodiments to have sufficient training data to reflect the wide range of variation over which normal activities are defined. In certain larger-scale applications, the amount of data is usually very large and this can potentially hinder the application of spectral methods. In this particular example, the surveillance video data is stored in the repositories of the public transport authority. For a week of data capture, there are millions of frames from a security camera. Direct application of spectral methods may be difficult due to physical limitations such as memory or bandwidth. To address this issue certain disclosed embodiments use compressed data. Using certain embodiments it is possible to apply the spectral method directly on the compressed data. This is possible in certain situation where it can be shown that there is a sufficiently high probability the anomaly detection performance is approximately equivalent to that on complete data provided that the data spectrum is sparse, which is often the case with many practical situations.

When a data subset, represented by a data vector is sparse or compressible, Compressed Sensing (CS) theory has shown that it is possible to sense the data vector via a simple, non-adaptive and linear projection $y=\Phi x$. The sensing matrix $\Phi$ has a significantly smaller number of rows than columns, i.e. $M \ll N$, meaning that the dimension of y is considerably smaller than x. Under suitable conditions on the approximate orthogonality between columns of the sensing matrix $\Phi$ it is possible to perfectly recover x from y via a convex optimization problem, which can be efficiently solved by specialized algorithms.

This implies that all the salient information about x is captured in y, making CS a useful tool for information preserving projection technique. When classification is needed instead of recovery, the use of CS may be an advantage as the number of processing samples is reduced to M (in practice, $M=O(K \log N) \ll N$).

The advantage of working in CS domain is that it overwhelmingly reduces the communication overhead and increases the scalability of the framework. For example, as the network data is sparse, only a small number of non-adaptive measurements M is needed to retain information about the main traffic.

Whilst the main focus of the CS community is on the recovery problem, i.e., to infer x from y, our focus in part is on anomaly detection. Thus, as the information about x is preserved in y, the present disclosure shows subsequently that it is possible to directly detect anomalies from the compressed data y.

In certain embodiments, the first step of the framework for system setup is to obtain compressed data using CS; the compression may be by sensor sub-sampling, or by temporal stream sub-sampling, or both.

Figure 15:
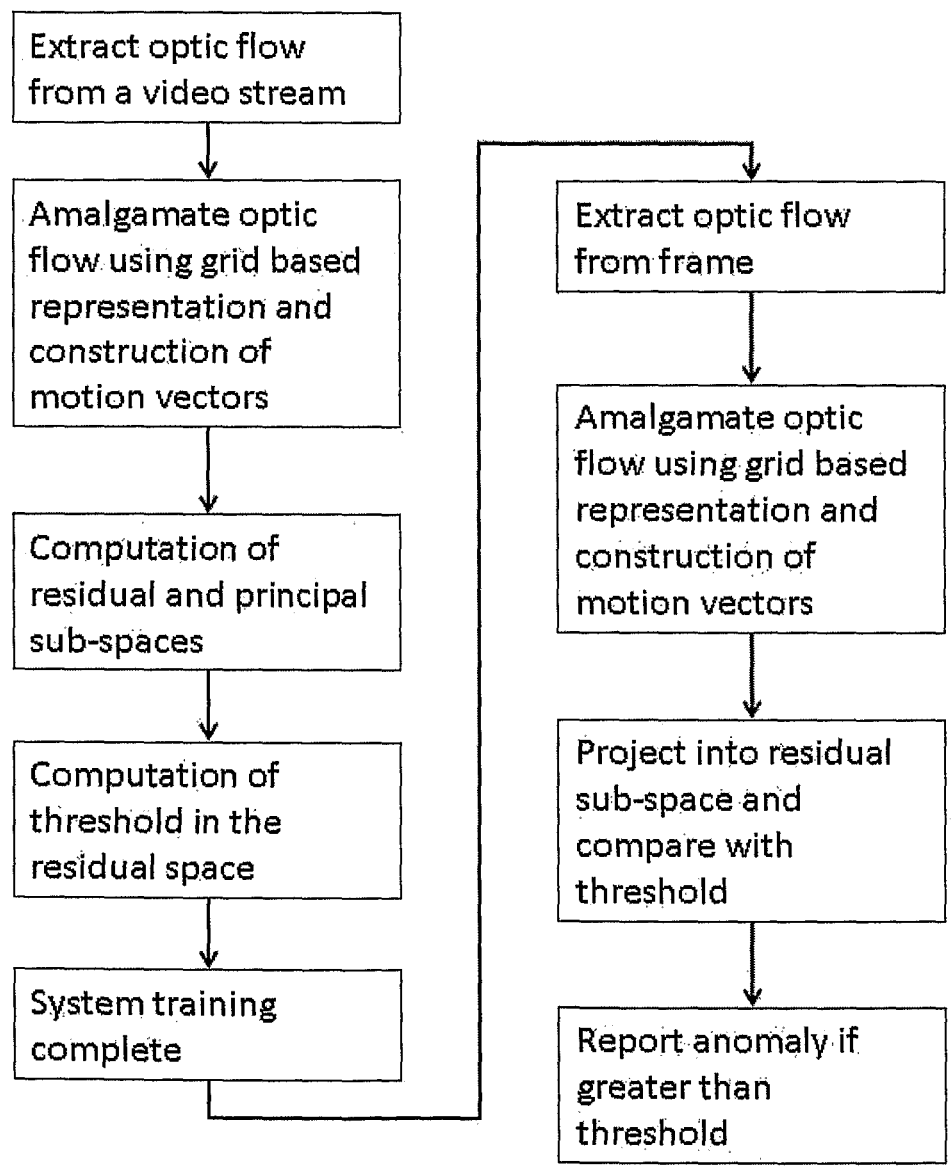
FIG. 15 illustrates a version of a flow process for anomaly detection with video data, in accordance with certain embodiments.

FIG. 15 illustrates the flow process for certain methods and systems disclosed. FIG. 15 shows a method for detecting infrequent events from video data. The method comprises: extracting first time series data from a video stream; amalgamating the first time series data using grid based representations; constructing at least one motion vector based at least in part on the amalgamated first time series data; processing the at least one motion vector based at least in part on the amalgamated first time series data to determine a residual subspace and a principal subspace; determining a threshold value for the residual subspace; extracting second time series data from a video frame of the video stream; amalgamating the second time series data using grid based representation; constructing at least one motion vector based at least in part on the amalgamated second time series data; comparing the at least one motion vector based at least in part on the amalgamated second time series data with the threshold value; and identifying an infrequent event if the at least one motion vector based at least in part on the amalgamated second time series data is greater than the threshold value.

Figure 16:
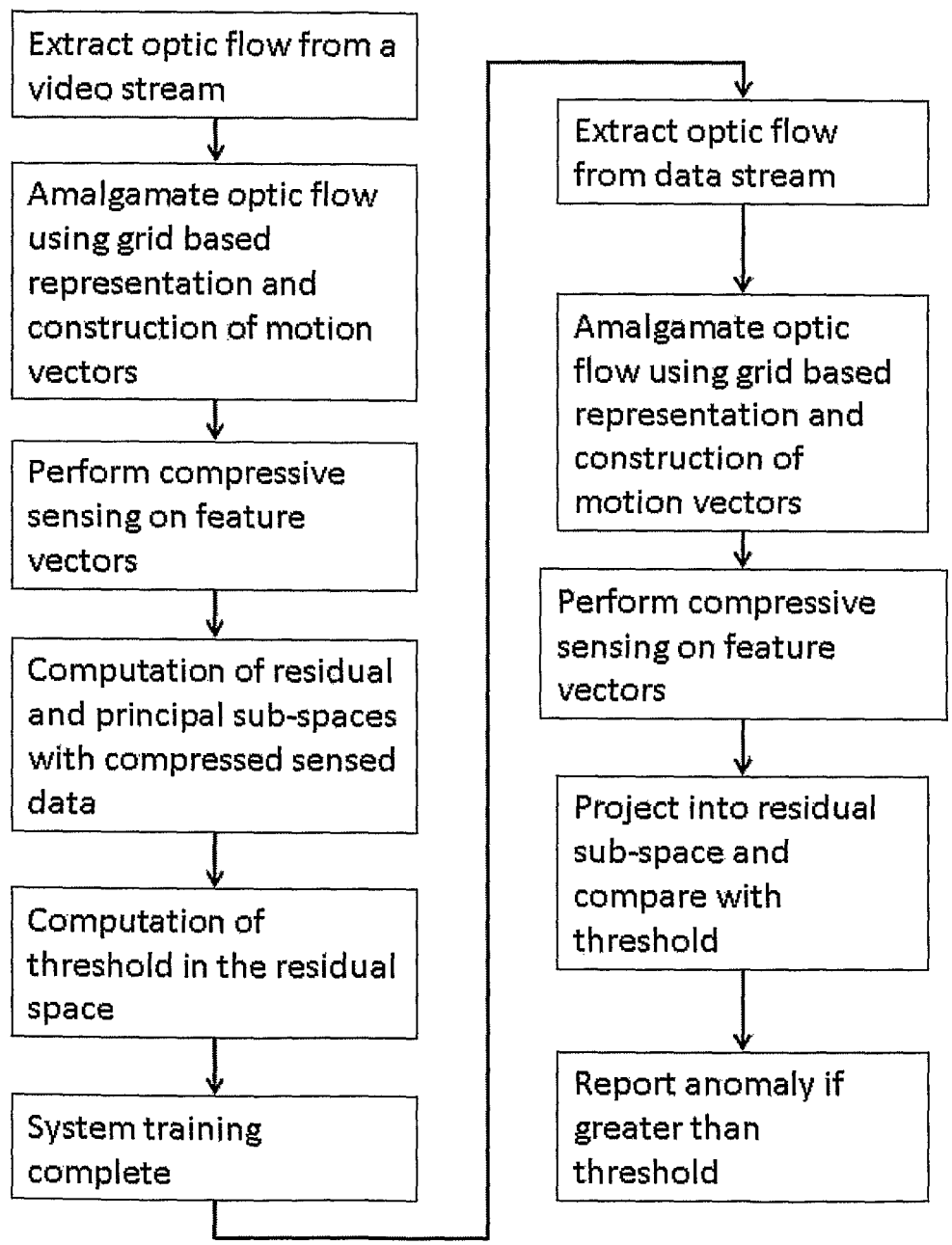
FIG. 16 illustrated a version of a flow process for anomaly detection with compressive sensed video data, in accordance with certain embodiments.

FIG. 16 illustrates the flow process for certain methods and systems disclosed. The method shown shows anomaly detections with compressive sensed video data. The method for detecting infrequent events from video data comprises: extracting first time series data from a video stream; amalgamating the first time series data using grid based representations; constructing at least one motion vector based at least in part on the amalgamated first time series data; performing compressive sensing on the at least one motion vector based at least in part on the amalgamated first time series data; processing the at least one compressed motion vector based at least in part on the amalgamated first time series data to determine a residual subspace and a principal subspace; determining a threshold value for the residual subspace; extracting second time series data from a video frame of the video stream; amalgamating the second time series data using grid based representation; constructing at least one motion vector based at least in part on the amalgamated second time series data; performing compressive sensing on the at least one motion vector based at least in part on the amalgamated second time series data; comparing the at least one compressed motion vector based at least in part on the amalgamated second time series data with the threshold value; and identifying an infrequent event if the at least one compressed motion vector based at least in part on the amalgamated second time series data is greater than the threshold value.

Figure 17:
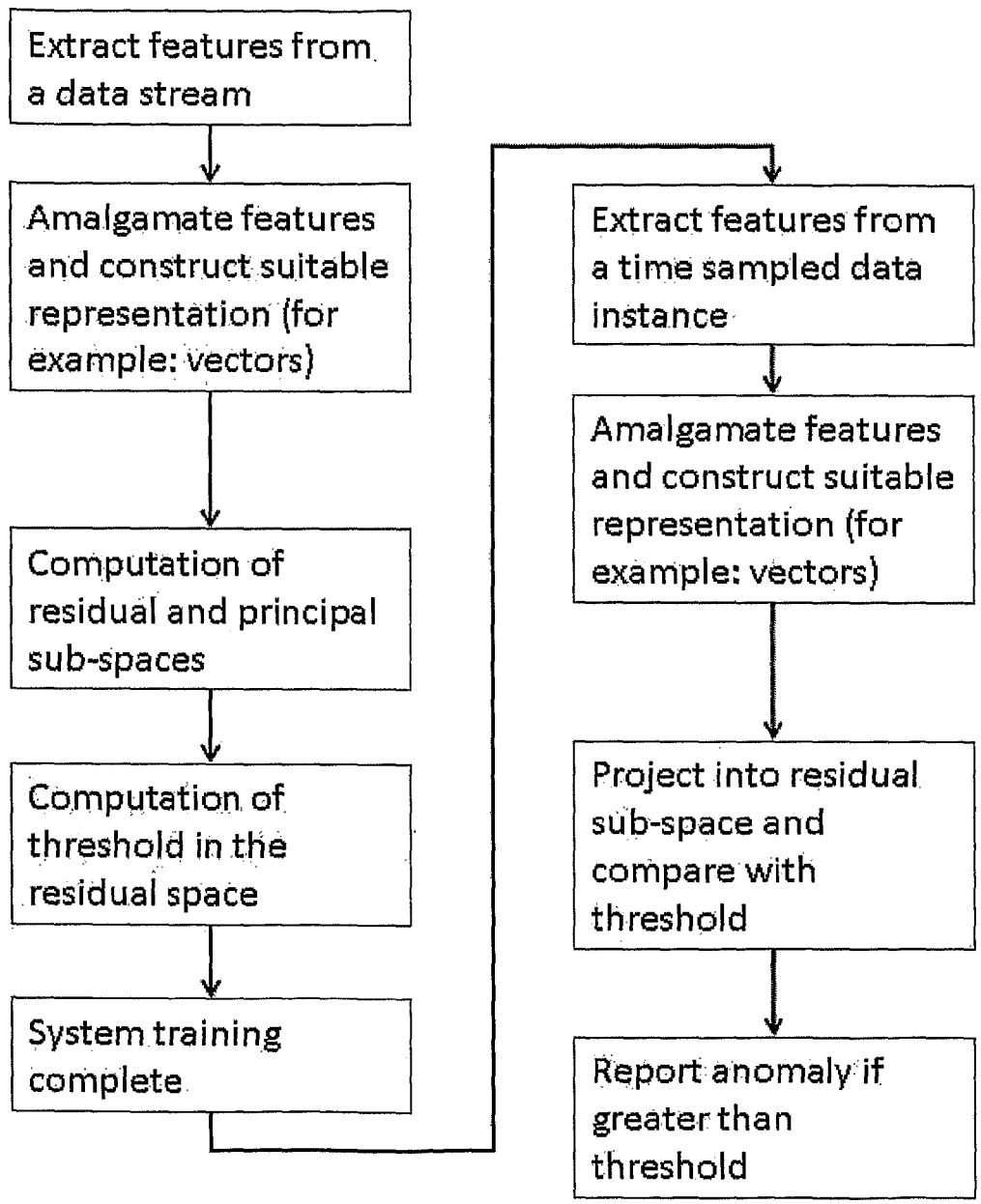
FIG. 17 illustrates a version of a flow process for anomaly detection with data, in accordance with certain embodiments.

FIG. 17 illustrates the flow process that may be applied to certain disclosed methods and systems. This figure is directed to anomaly detection from a data stream. FIG. 17 shows a method for detecting infrequent events from a data stream that comprises: extracting first features of the data from the data stream; amalgamating the first features using grid based representations; constructing at least one features vector based at least in part on the amalgamated first features; processing the at least one features vector based at least in part on the amalgamated first features to determine a residual subspace and a principal subspace; determining a threshold value for the residual subspace; extracting second features data from a data frame of the data stream; amalgamating the second features data using grid based representation; constructing at least one features vector based at least in part on the amalgamated second features data; comparing the at least one features vector based at least in part on the amalgamated second features data with the threshold value; and identifying an infrequent event if the at least one feature vector based at least in part on the amalgamated second features data is greater than the threshold value. The flow process illustrated in FIG. 17 may be applicable to non-network data.

Figure 18:
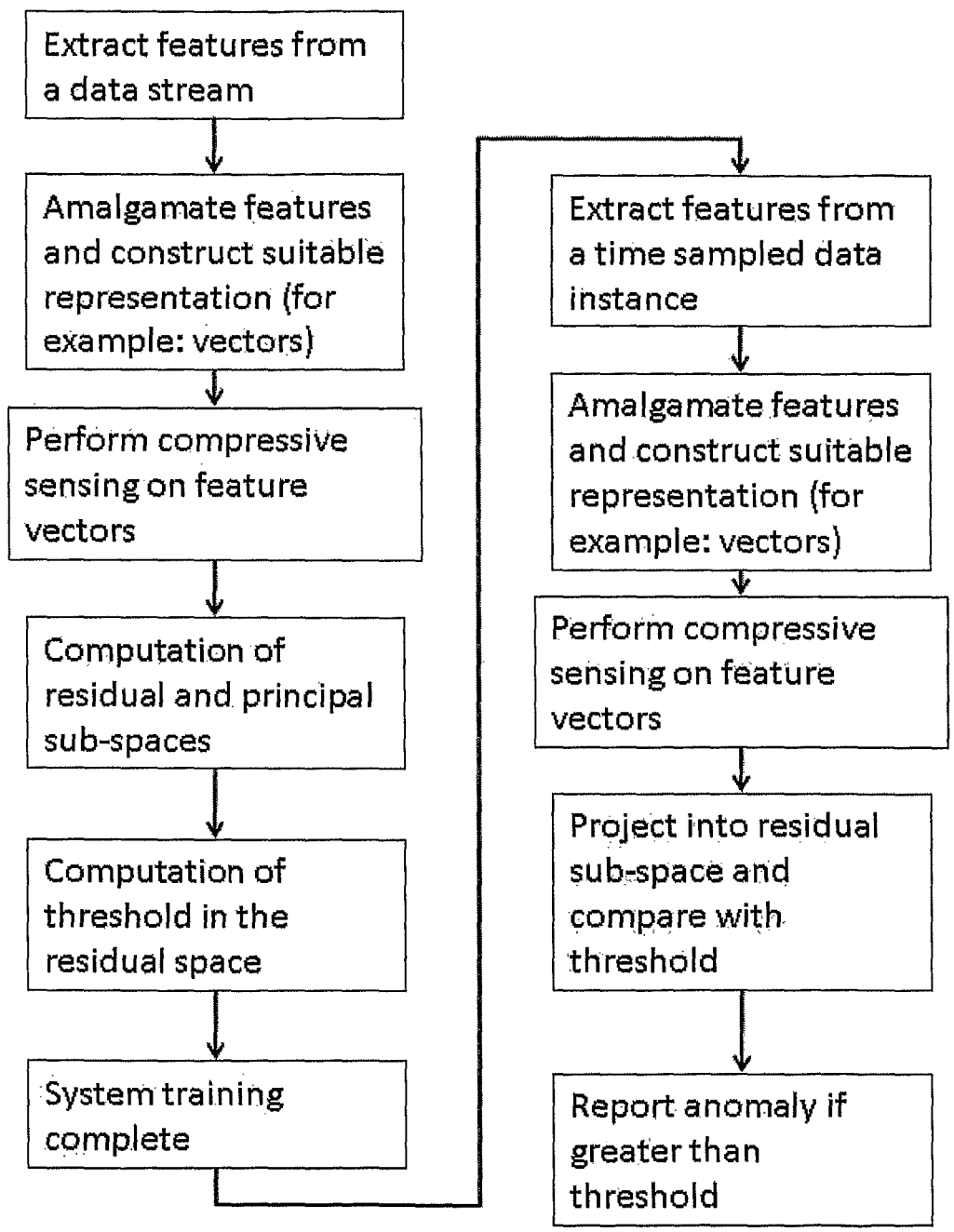
FIG. 18 illustrates a version of a flow process for anomaly detection in compressive sensed data, in accordance with certain embodiments.

FIG. 18 illustrates the flow process for certain disclosed methods and systems. FIG. 18 is directed to a method for detecting anomalies in compressive sensed data. FIG. 18 shows a method for detecting infrequent events from a data stream that comprises: extracting first features of the data from the data stream; amalgamating the first features data using grid based representations; constructing at least one features vector based at least in part on the amalgamated first features data; performing compressive sensing on the at least one features vector based at least in part on the amalgamated first features data; processing the at least one compressed features vector based at least in part on the amalgamated first features data to determine a residual subspace and a principal subspace; determining a threshold value for the residual subspace; extracting second features data from a data frame of the data stream; amalgamating the second features data using grid based representation; constructing at least one features vector based at least in part on the amalgamated second features data; performing compressive sensing on the at least one features vector based at least in part on the amalgamated second features data; comparing the at least one compressed features vector based at least in part on the amalgamated second features data with the threshold value; and identifying an infrequent event if the at least one compressed features vector based at least in part on the amalgamated second features data is greater than the threshold value.

Case 1: For the sensor sub-sampling case: In certain embodiments, a linear transformation on the data $y=\Phi x$ where $\Phi \in \mathbb{R}^{M \times N}$ is known is obtained as the CS measurement matrix whose entries are random variables. CS approaches offer many classes of CS matrices that can be efficiently implemented in practice. For example, in the database friendly CS matrices the entries can take values of either 0 with probability 2/3 or +/−1 with probability 1/6. If all sensors have synchronized clocks and the same random generator, a rule can be set up so that the sensors send their pre-modulated reading with +/−1 depending on the value of the random generator. Alternatively, when the sensors cannot directly reach the central node such as in an wireless communication link over a large spatial domain, the random gossip algorithm can be applied to propagate the projection y to the central node. The additional advantage compared with, for example, the decentralization approach is that the central node can now perform the analysis using the residual method on the compressed data with nearly optimal performance.

Case 2: For the temporal stream frame sub-sampling case: By using the compressed sensing approach and the CS matrix, the operator can request the server to generate random numbers and select instances corresponding to the random values +/−1, sum these two sets of instances, subtract them, and iteratively send such L' results to the operator where L'<<L. By doing this not just the limited bandwidth and storage can be efficiently utilized, the operator can also detect anomalies successfully as if the full data is available.

EXPERIMENTAL EXAMPLES

The following experimental examples illustrate certain aspects of the disclosed embodiments. These examples are not meant to be limiting in nature but illustrative of how certain disclosed methods and systems may work. The following experimental examples are providing as non-limiting illustrations.

In these exemplary experiments anomalous events are considered to have a duration of approximately 10 seconds. In other embodiments, the duration of anomalous events may be varied to meet the needs of the particular application. The motion information was extracted using the openCV implementation of an algorithm that uses the Lucas-Kanade optical flow features.

PETS2007 Benchmark Data

The first set of exemplar experiments used the PETS2007 datasets which consist of video footage obtained from a multiple camera surveillance system. For the PETS datasets processing, the time granularity for aggregating the motion count was set to 100 frames.

For the training process, the experiment used the S0 sequences which consisted of 4500 frames captured at a resolution of 720 by 576. The training sequences contained no unusual events and no specially assigned actors while the crowd density typically (depending on the camera) was medium.

Figure 4:
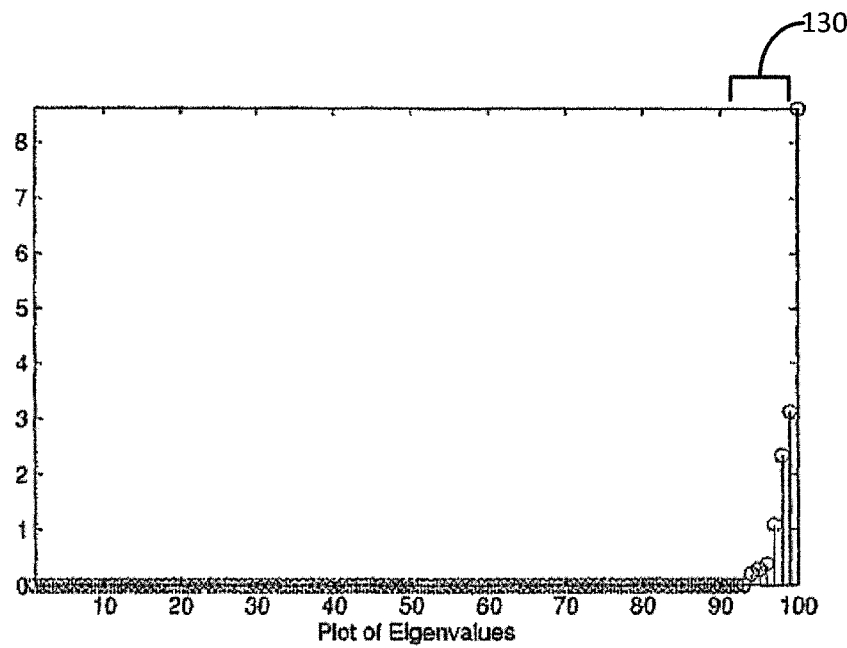
FIG. 4 is a plot showing the magnitude of the eigenvalues computed from $X_{Train}$ (sequence S0, camera 1), in accordance with certain embodiments.

The first PETS2007 test sequence used was S3 captured by camera 1. The sequence consisted of 2970 frames and the anomaly was a theft event. It involved two actors walking normally towards the middle of the scene where after a brief stop, they proceeded to pick a bag and leave the area. As this event took place, there was a significant flow of people in the top part of the scene. Hence, for the exemplary approach to produce the correct results, it would need to detect the anomaly and correctly highlight the time interval over which the anomalous event took place. From the training and testing sequences, $X_{Train}$ and $X_{Test}$ were created. As the sequence was short, PCA was applied directly on the features extracted from the training sequence as described and the eigenvalues are plotted in the FIG. 4. The largest three eigenvalues (i.e. K=3) for the principal subspace 130 were chosen, while the rest of the eigenvectors span the residual subspace. The threshold $Q_\beta$ was computed according to the 1-β confidence level and the value of β to be equal to 0.005 was chosen.

Figure 5A:
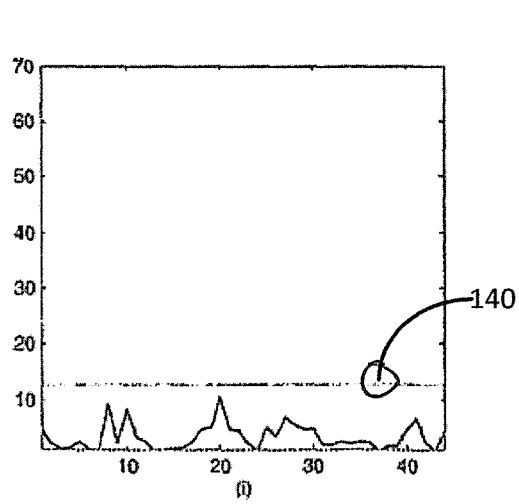
FIG. 5(a) is a plot showing the magnitude of each column vector of $X_{Train}$ (sequence S0, camera 1) after the projection into residual subspace, in accordance with certain embodiments.
Figure 5B:
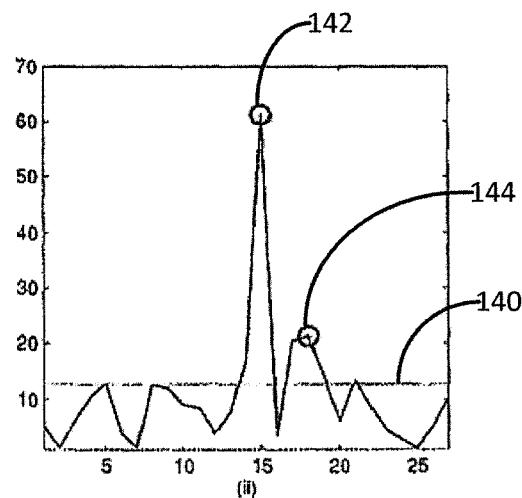
FIG. 5(b) is a plot showing the magnitude of each column vector of $X_{Test}$ (sequence S3, camera 1) after projection into residual subspace.

FIG. 5 (a) shows the projection of each column of $X_{Train}$ and FIG. 5(b) the projection of each column of $X_{Test}$ into the residual subspace. The horizontal line 140 denotes the threshold $Q_\beta$.

Figure 6A:
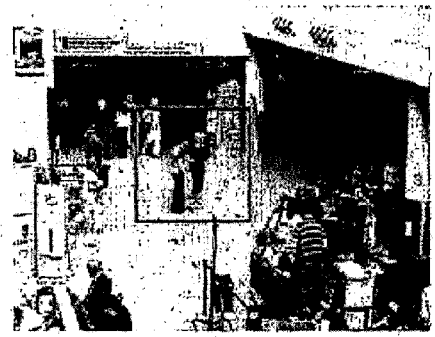
FIG. 6(a) and (b) are two frames from a detected "anomalous" activity in sequence 3 from camera 1 (PETS2007 dataset, in accordance with certain embodiments.
Figure 6B:

The theft event is highlighted in the residual subspace the threshold $Q_\beta$ is exceeded. It should be noted that the plot for the residual domain shows two peaks, 142 and 144 which correspond to events which are 50 frames apart and thus considered to be part of the same anomalous event. Two frames of the scene containing the anomaly are shown in FIGS. 6 (a) and (b). The results demonstrate that this exemplary approach successfully detected the anomalous event that took place.

Figure 7A:
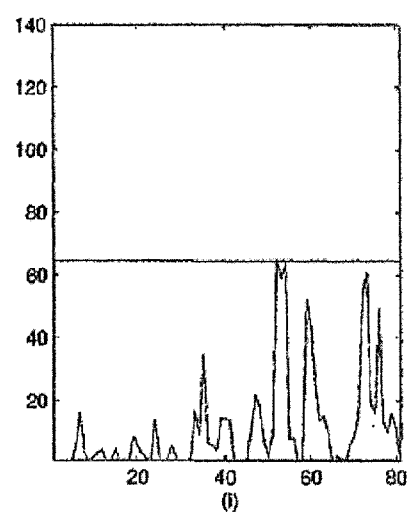
FIG. 7(a) is a plot showing the magnitude of each column vector of $X_{Train}$ (sequence S0, camera 3) after the projection into residual subspace, in accordance with certain embodiments.
Figure 7B:
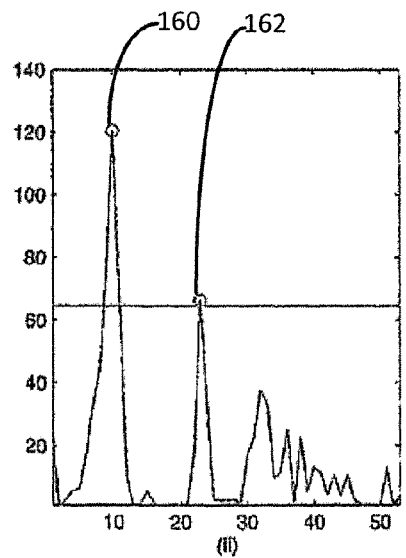
FIG. 7(b) is a plot showing the magnitude of each column vector of $X_{Test}$ (sequence S3, camera 3) after projection into residual subspace.

To test the robustness of this approach in different environment conditions used sequence S3 captured by camera 3 as a test set (with the sequence S0 from camera 3 used for training) were used. FIG. 7 shows the plots of the projection of each column of $X_{Train}$ and $X_{Test}$ into the principal and residual subspaces. Despite the different lighting and camera angle, the exemplary approach still detected the anomalous event 160 and 162 successfully.

The results from the four sequences are summarized in the top four entries of Table 1.

TABLE 1

| DataSets | Frames (Training) | Frames (Testing) | Real | Detected | FPs | FNs |
|---|---|---|---|---|---|---|
| PETS(CAM 1 SEQ 3) | 4,500 | 2,971 | 1 | 1 | 0 | 0 |
| PETS(CAM 1 SEQ 6) | 4,500 | 2,735 | 1 | 1 | 0 | 0 |
| PETS(CAM 2 SEQ 3) | 4,500 | 2,971 | 1 | 1 | 1 | 0 |
| PETS(CAM 3 SEQ 3) | 4,500 | 2,972 | 1 | 1 | 0 | 0 |
| PTA Dataset (Tunnel-Camera 1) | 90,000 | 90,000 | 3 | 2 | 0 | 1 |
| PTA Dataset (Tunnel-Camera 2) | 90,000 | 90,000 | 6 | 5 | 1 | 1 |
| PTA Dataset (Stairs) | 100,000 | 36,770 | 2 | 2 | 0 | 0 |
| PTA-Rail Track (Station1 Cam 1) | 6,234 | 10,504 | 2 | 2 | 0 | 0 |
| PTA-Rail Track (Station1 Cam 2) | 6,363 | 10,479 | 2 | 2 | 3 | 0 |
| PTA-Rail Track (Station2 Cam 1) | 450,239 | 660,002 | 3 | 3 | 5 | 0 |
| PTA-Soft Drink (Vending Machine) | 529,410 | 1,311,890 | 2 | 2 | 1 | 0 |

PTA DataSets

Figure 8A:
FIG. 8(a), (b) and (c) are three screen shots showing heavy, medium and light crowd density, respectively.
Figure 8B:
Figure 8C:
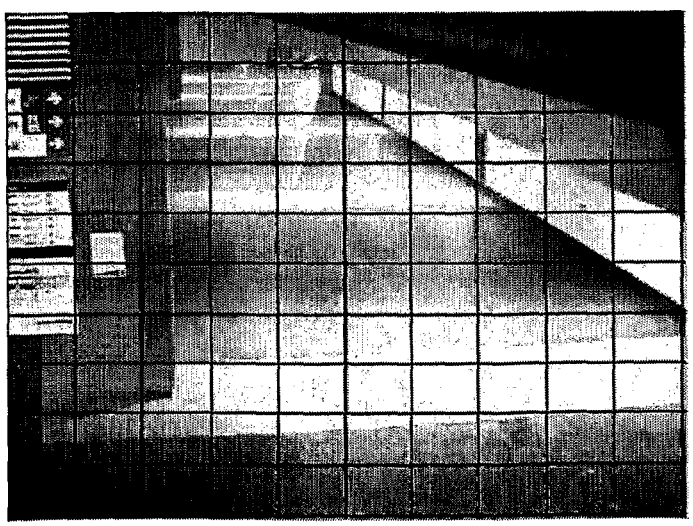

The second set of exemplary experiments used data provided by the Public Transport Authority (PTA) and involved video sequences captured from the central train station. The video data was obtained from two cameras—camera 1(captured video at 10 frames per second) and camera 2(captured video at 6 frames per second). This example uses video data from both cameras for anomalous event detection and scalability analysis. The video data captured the people movement in the station's tunnel in the morning period between 7 AM to 11 AM over the seven days of a week. The resolution of each frame was 576×720. This example divided each frame into grids, and quantized the motion flows in each cell and generate the cell observation matrix. Examples of the variation in the density of the crowd at different times in the morning period are shown in FIGS. 8 (a), (b) and (c). The sequences were reviewed by an expert who provided the ground truth information.

Anomalous Event Detection

Figure 9A:
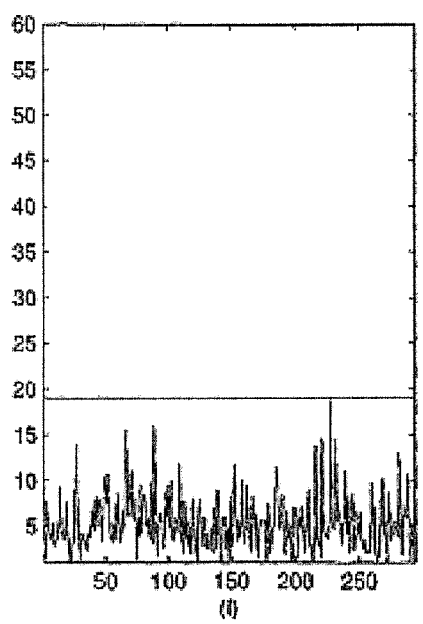
FIG. 9(a) is a plot showing the magnitude of each column vector of $X_{Train}$ data after the projection into residual subspace, in accordance with certain embodiments.
Figure 9B:
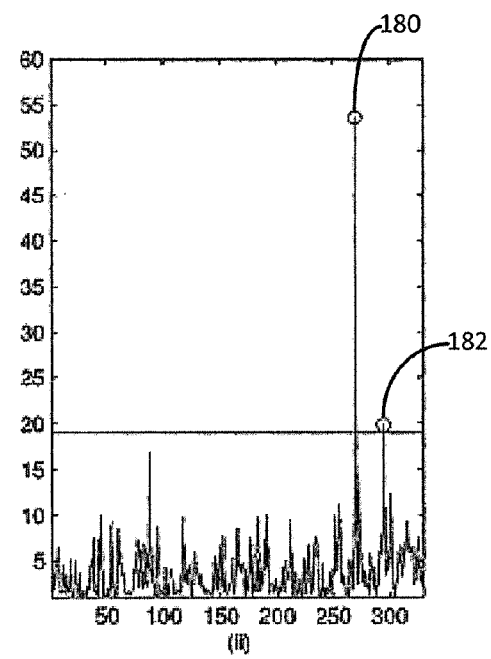
FIG. 9(b) is a plot showing the magnitude of each column vector of $X_{Test1}$ data after the projection into residual subspace.

In the example, for anomalous event detection the training set $X_{Train}$ from two consecutive days for a total 8 hours of video was built. The testing datasets ($X_{Test1}$ and $X_{Test2}$) were built from observations from two other weekdays. Since there were 90,000 frames in the $X_{Train}$, and 115,000 frames in $X_{Test1}$ and $X_{Test2}$) and the motion was aggregated over 300 frames (L=300), PCA was still used. The 6 eigenvectors corresponding to the 6 largest eigenvalues (K=6) were chosen for the principal subspace, and the rest were used to span the residual subspace. The example then projected the columns of $X_{Train}$ and $X_{Test1}$ in the residual subspace as shown in FIGS. 9(a) and (b). The threshold $Q_\beta$ was computed in a similar way to the previous exemplar experiment with β=0.005.

Figure 10A:
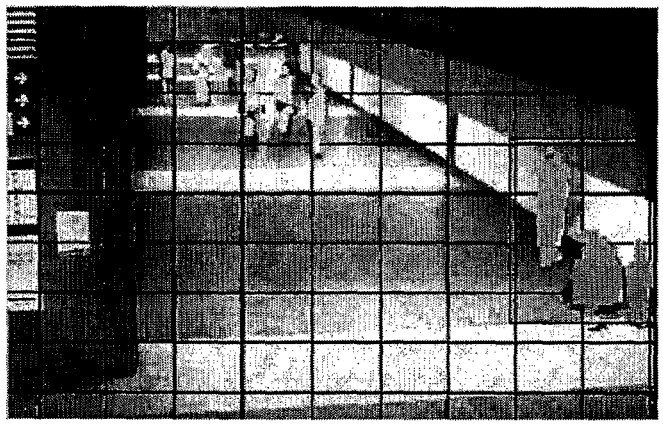
FIG. 10(a), (b) and (c) are a series of three screenshots illustrating anomaly detection, in accordance with certain embodiments.
Figure 10B:
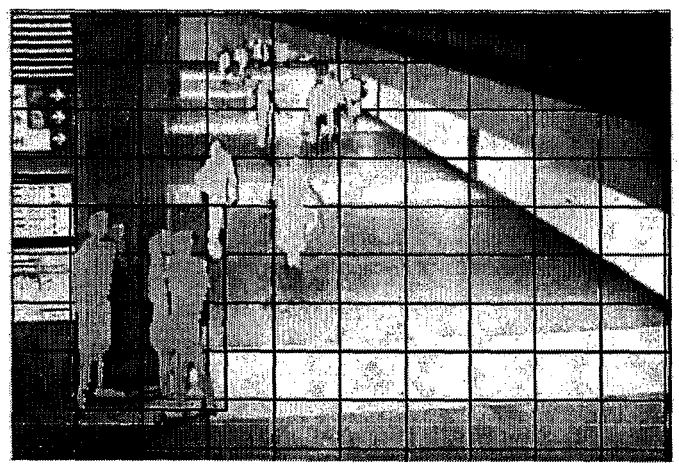

Two real anomalies 180 and 182 were detected out of three from the test data with the detected anomalies corresponding to:

leaning and moving a small child against the wall, see FIG. 10(a). And, loitering, see FIG. 10(b).

The detected events were 1 minute long. These anomalies occurred due to changes in the motion distributions of the cells which while local in nature, were clearly detectable in the residual subspace.

Figure 10C:
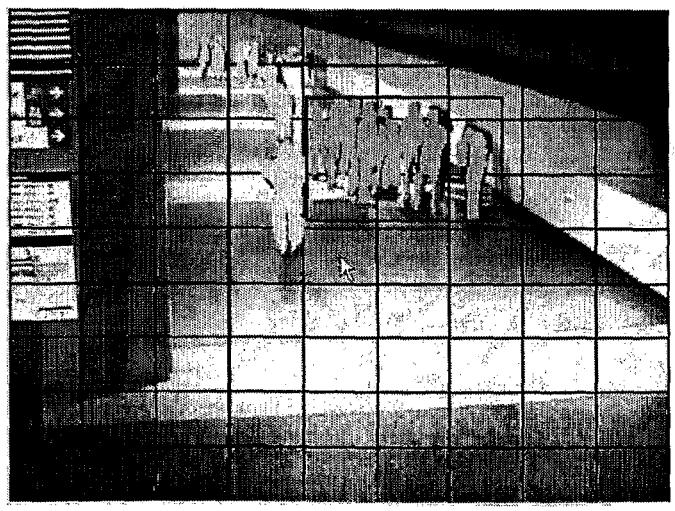

The anomaly missed was due to the fact that it took place far away from the camera and as a result, it was difficult to detect because the motion data was inconsistent. The same experiment with the second test set ($X_{Test2}$) an and detected the anomalous event "group loitering" was repeated, see FIG. 10(c) which occurred during "off-peak" hours.

Scalability testing on the data captured by both cameras was performed. The dataset had around 1 million frames of resolution 576×720 which was captured at 6 frames per second over a 7 day period. Using data from 6 days for training and data from one day for testing, the motion flows of 30 seconds (L=3000) were aggregated. However, in this case the randomized PCA described above was computed. 20% of the total training vectors were sampled and R-PCA on the small scale sampled data was performed. FIG. 11(a) shows the plot of eigenvalues computed by PCA, and FIG. 11(b) shows the plot of eigenvalues computed by R-PCA. The R-PCA computation was performed over 100 iterations and the average results are shown.

In another set of exemplary experiments, other PTA video sequences captured from cameras covering the stairs (1 sequence) were also used, an automated vending machine (1 sequence) and the rail tracks from two different stations (3 sequences). Both the stairs and vending machine sequences were very long (8 and 16 hours respectively). In the case of the rail tracks data, two of the train and test sequences were short, while the third sequence was again very long (18 hours). In these experiments, a total of 27 hours of continuous video (without any anomaly) for training and 55 hours of video for testing (some of the video which involved zoom action was removed as the system was evaluated using static views) was used. The results are summarized in Table 1. In summary, a total of 20 real anomalies were present in the PTA video streams and the exemplar approach was able to identify 18 anomalies correctly while producing two false negative and 10 false positives. The false positive was mainly due to difficulty of differentiating between a person breaking into the vending machine and the maintenance persons etc. The false negative was due to the movement that took place far away from the camera.

Scalability Performance

As demonstrate, the disclosed methods and systems using compressed data are scalable in both network anomaly detection and the aforementioned abnormal behaviour detection from video footages. For the network data, both a real-world benchmark dataset (Abilene) and a simulated dataset specifically designed to test anomaly detection capability of our framework was used. For the video data, a subset of the PTA data was used.

Network Anomaly Detection

The purpose of this exemplar experiment was to determine the volume anomaly detection in the compressed domain using a real-world dataset. The traffic flow in a network is the amount of traffic flowing in between each pair of ingress and egress nodes in the network. It is also known as an origin-destination (OD) flow, which is the traffic that enters the backbone at the origin point of presence (PoP) and exits at destination PoP. The flow has two main characteristics, that is (i) normal behaviour due to the usual traffic pattern (for example, daily demand fluctuation) as shown in the Abilene dataset.

The Abilene dataset consists of the readings collected from 41 network links over a period of several months. See http://www.abilene.iu.edu. A subset of the data which covers a period of 2 weeks (1008 measurements per week) was used. The majority of the data reflects normal network conditions with only 6 real anomalies (verified manually) in the original dataset. In addition, 45 synthetic anomalies of different magnitudes were injected following the procedure described in A. Lakhina et al. Diagonising network-wide traffic anomalies. In *Proc. ACM SIGCOMM*, 2004.

For training, the trace from the first week was used while the trace from the second week was used as the test data. CS theory was used using random matrices to compress the data before anomaly detection takes place; for instance random Gaussian, random Bernoulli, and random partial Fourier matrices, or combinations thereof.

To obtain a good sensing matrix, the exemplar experiment started with a random Gaussian matrix and then applied the recently proposed algorithm by Elad. See M. Elad. Optimized projections for compressed sensing. *IEEE Trans. Sig. Process.*, 55:5695-5702, 2007. This algorithm exploits the fact that the mutual coherence of Φ, with each column normalized to unit norm, is the maximum magnitude of the off-diagonal elements of the Gram matrix $G=\Phi^T$ where the Gram matrix has the rank M. Hence, by iteratively shrinking the entries of the Gram matrix, forcing its rank to M, and taking square root, a smaller mutual coherence for Φ with a specified rank M is achieved.

Simulated Network Traffic Datasets

In this set of exemplar experiments, anomaly detection in a large network traffic simulation was used, see A. Lakhina et al. Diagonising network-wide traffic anomalies. In *Proc. ACM SIGCOMM*, 2004, where the number of local monitors N ranges from 500 to 2000 and the number of time instances is L=2000. The synthetic data sets were generated as following: the network signal is represented as, x as x=s+n where $x \in R^N$. It consists of two parts: s characterizes the long-term structure in the data and n represents the local temporal variation.

It has been shown; see A. Lakhina et al. Diagonising network-wide traffic anomalies. In *Proc. ACM SIGCOMM*, 2004, that signal s is sparse in some basis and n still has noise-like behaviour. Here it was assumed that noise n are iid Gaussian with mean zero and variance $\sigma^2$. DCT was selected as the basis after considering the daily periodic characteristics of the network traffic. The number of principal components is K=4, which in these circumstances may be a reasonable trade-off between sparsity and the amount of energy captured in the principal subspace. Here, zero-mean Gaussian noise (n) with σ=0:01 was added. To simulate abnormal network conditions 70 anomalies were injected of different magnitude in the data following the procedure specified in A. Lakhina et al. Diagonising network-wide traffic anomalies. In *Proc. ACM SIGCOMM*, 2004.

When selecting the number of CS measurements (M), the trade-off between performance and error rate was considered. Selecting a smaller value of the CS dimension M reduces the computational complexity at the cost of a potentially lower performance due to the increase in the mutual coherence of the sensing matrix. In the CS literature, the value of 0(K log N) has been frequently suggested. If M is too low, the error rate becomes much larger. If M is too large, the reduction in error rate is not very significant whilst the computational time increases somewhat quadratically. Therefore, we determined that for these exemplary experiments suitable values of M are 118, 280, and 450 when number of nodes are 500, 1000 and 2000 respectively. The sensing matrices were random Gaussian with a mutual coherence of 0.37, 0.35 and 0.20 respectively.

Normal snapshots for training and anomalous data for testing was used. A Gaussian sensing matrix where, M=280, N=1000 was randomly generated. Using Elad's algorithm, M. Elad. Optimized projections for compressed sensing. *IEEE Trans. Sig. Process.*, 55:5695-5702, 2007, a mutual coherence of 0:35 from the initial coherence of 0:55 was achieved. The threshold limit Q was computed according the confidence level. The number of dominant eigenvalues was preserved when applying anomaly detection to both the full and compressed data sets.

The precursor step has been validated by considering both network and surveillance volume anomalies. For the network data, an algorithm, according to certain embodiments, on real traffic traces collected from the Abilene network was evaluated, see http://www.abilene.iu.edu, over four weeks and synthetic data simulated following the property of typical networks. The experiments verify that on the real dataset, the method, according to certain embodiments, using compressed data achieves equivalent performance with a detection rate of more than 94%.

For synthetic data, experiments show that the residual subspace analysis method performs even better in compressed domain than uncompressed domain for high dimensional data. Furthermore, the proposed method requires less memory and storage and can be as much as 100 times faster than the original spectral method using raw data.

The PTA Video Dataset

For this exemplar experiment, the temporal sub-sampling was performed to effectively reduce the amount of data streaming from the PTA repositories.

Here, the video data captured from the corridors of the train station in the peak hours of the day (7 AM to 11 AM) over a whole week was used. The 25 fps video data at resolution 570×720 was collected by two different cameras at the entry and exit points of the train station. For the training set $X_{Train}$ video from five consecutive days was used where each day has 4 hours continuous video and day $6^{th}$ ($X_{Test1}$) and $7^{th}$ ($X_{Test2}$) was used for testing only. For training, the original number of aggregated time bins is L=7200, the number of grid cells is N=100, and the window length is 10 s.

Figure 12A:
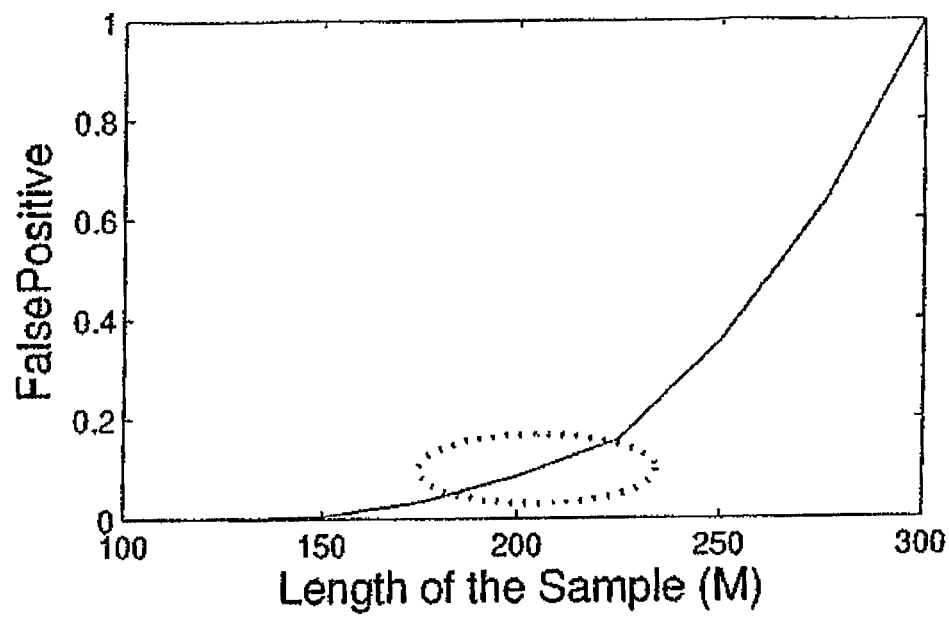
FIG. 12(a) is a plot of the normalised false positive rate (FPR), in accordance with certain embodiments.
Figure 12B:
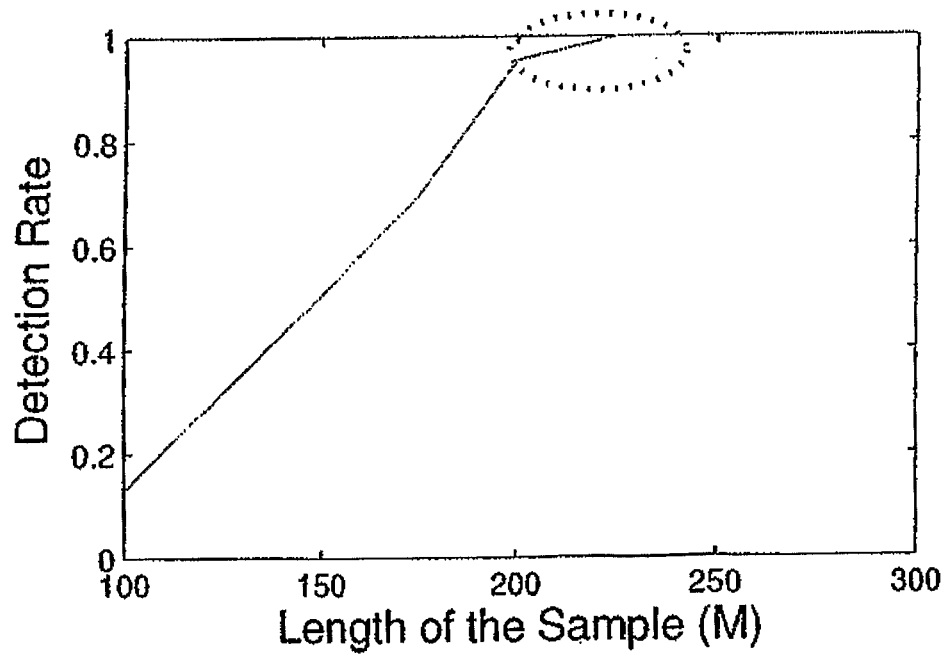
FIG. 12(b) is a normalised plot of the anomaly detection rate.
Figure 13A:
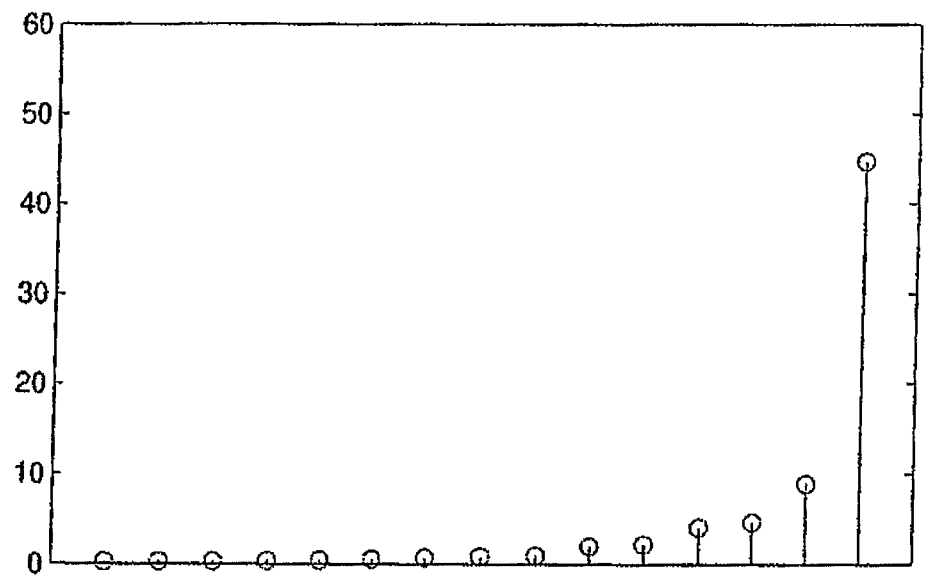
FIG. 13(a) is an Eigenvalue plot of $X_{Train}$ data using complete data, in accordance with certain embodiments.
Figure 13B:
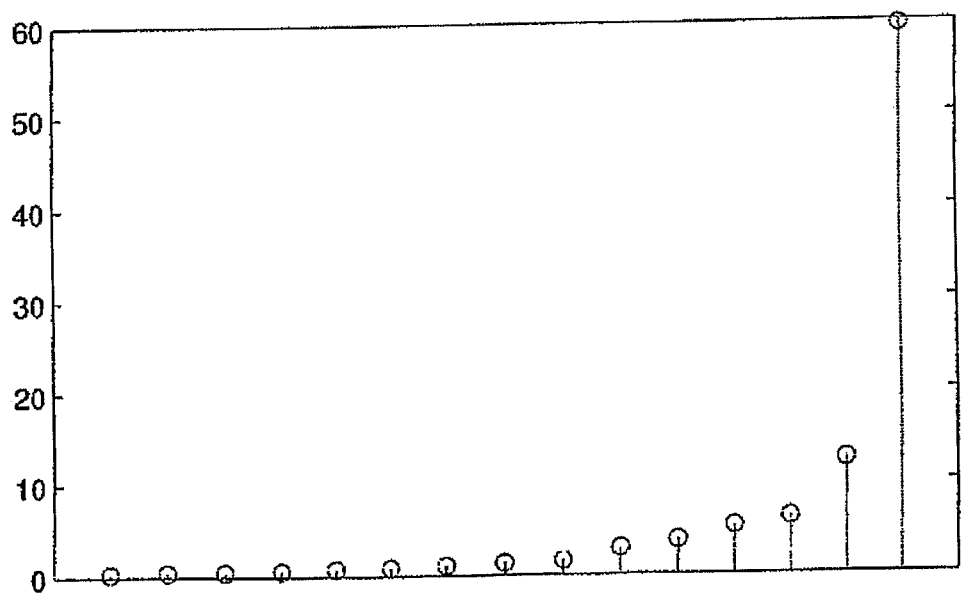
FIG. 13(b) is an Eigenvalue plot of $X_{Train}$ data using compressed data.
Figure 14A:
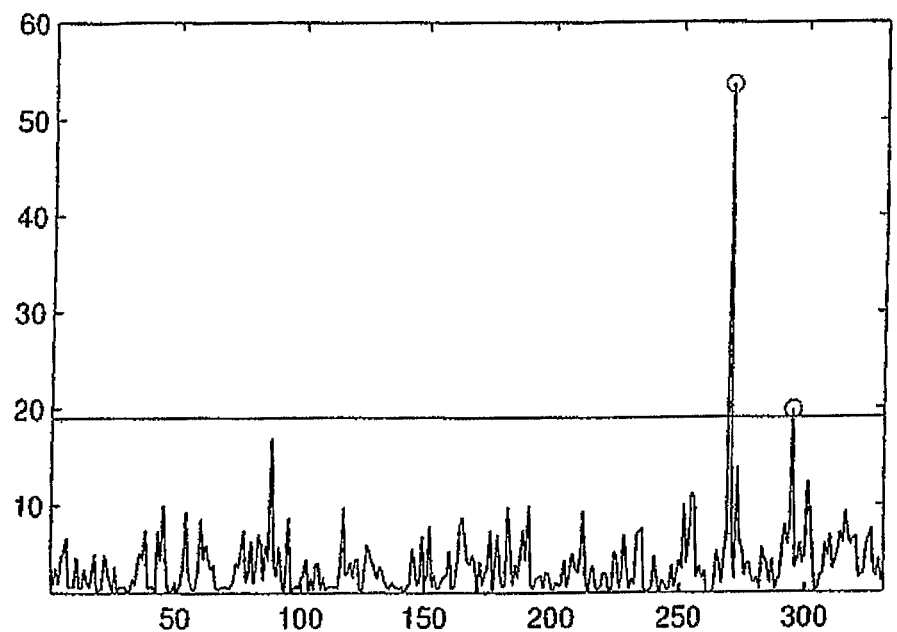
FIG. 14(a) is a residual plot of $X_{Test1}$ data using complete data, in accordance with certain embodiments.
Figure 14B:
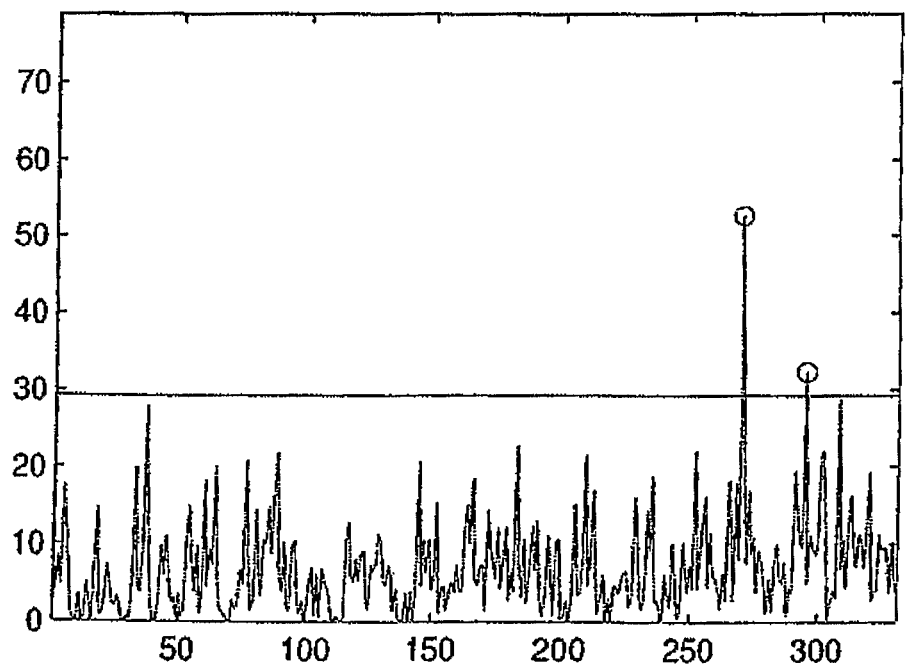
FIG. 14(b) is a residual plot of $X_{Test1}$ data using compressed data (bottom).

The temporal stream data was sub-sampled, so that the number of snapshots was reduced to M when the length of the snapshots (L) was large and M<<L. One issue was to select the value of M for an optimal performance. FIG. 12 shows the plots for the false positive rate (FPR) and the rate of anomaly detection (both were normalized to 1), when M varies from 100 to 300 for the above mentioned datasets. When M is in the range of 190~230, the FPR is at a minimum and detection rate is maximized. Effectively, the reduction in the amount of data streaming from the server from L=7200 to M=220 address the bandwidth constraints. FIGS. 13 and 14 further illustrates that the spectral properties are approximately preserved using the compressed data and that the residual behaviour is almost similar.

The present disclosure may be used in a variety of areas, for instance, but not limited to, to increase efficiency in security surveillance of public areas and venues. It may be integrated with alarm and response systems. It may also be applied in other areas, such as urban planning and crowd management.

The invention claimed is:

1. A method for processing, detecting and/or notifying for the presence of at least one infrequent event from at least one large scale data set comprising:
   receiving time series data;
   representing either the time series data, or one or more features of the time series data, as sets of vectors, matrices and/or tensors;
   performing compressive sensing on at least one vector, matrix and/or tensor set;
   decomposing the at least one compressive sensed vector, matrix and/or tensor set to extract a residual subspace; and
   identifying, using a computing device, potential infrequent events by analysing compressive sensed data projected into the residual subspace.

2. A method according to claim 1, wherein the one or more features of the time series data are one or more variables associated with a subset of the time series data.

3. A method according to claim 1, wherein the one or more features of the time series data are the difference in any variable between any two subsets of the data of the time series data.

4. A method according to claim 3, wherein the time series data is a stream of at least one of video and audio surveillance data, each subset is a frame and the feature is a motion or frequency information between each successive pair of frames.

5. A method according to claim 3, wherein the time series data comprises a stream of video data, each subset comprises a frame and the feature comprises motion information between each successive pair of frames, the motion information being determined by dividing each frame of video by a grid into cells, and then counting a number of optic flow vectors in each cell to provide optical flow information.

6. A method according to claim 5, wherein the optical flow information is represented using bag-of-visual-words.

7. A method according to claim 6, wherein from the bag-of-visual-words a feature-frame matrix is constructed by amalgamating the feature vectors for all frames in the sequence.

8. A method according to claim 7, wherein the feature-frame matrix is then structurally decomposed into the observed into principal and residual components.

9. A method according to claim 8, further comprising detecting abnormal events in the residual subspace using a Q-statistic based test statistic.

10. A method according to claim 1, wherein a pre-cursor step is employed to transform the data to the Compressed Domain, to reduce the data to a manageable size.

11. A method according to claim 10, wherein the pre-cursor step of transforming the data to the compressed domain is deployed for reducing a feature dimension in the compressed domain and employs a sensing matrix having entries with values of either 0 with probability 2/3 or +/−1 with probability 1/6.

12. A method according to claim 11, wherein a random gossip algorithm is applied.

13. A method according to claim 10, wherein the precursor step of transforming the data to the compressed domain is deployed for reducing a time instances in the compressed domain and employs frame sub-sampling.

14. A method according to claim 10, wherein the features are represented as sets of vectors before being transformed to the Compressed Domain.

15. A method according to claim 1, wherein said identifying potential infrequent events involves thresholding the data projected into the residual sub-space.

16. A system comprising:
at least one sensor to receive data comprising a time series of data subsets for analysis;
a computer memory for storing the data;
a computer processor for:
representing either the time series data, or one or more features of the time series data, as sets of vectors, matrices and/or tensors;
performing compressive sensing on the at least one vector, matrix and/or tensor set;
decomposing the selected sets of compressive sensed vectors, matrices and/or tensors to extract a residual sub-space; and
identifying potential infrequent events by analysing compressive sensed data projected into the residual sub-space.

17. The system of claim 16, wherein the computer processor is co-located with the at least one sensor.

18. The system of claim 16, wherein the computer processor is remotely located from the at least one sensor.

19. The system of claim 16, wherein a portion of the computer processor is remotely located from the least one sensor and performs the step of identifying potential infrequent events by analysing compressive sensed data projected into the residual sub-space.

20. The system of claim 16, wherein the functionality of the computer processor is divided between a sub-processor co-located with the at least one sensor and a sub-processor remotely located from the at least one sensor.

* * * * *